US008342944B2

(12) United States Patent
Gagner et al.

(10) Patent No.: US 8,342,944 B2
(45) Date of Patent: Jan. 1, 2013

(54) PERSISTENT STATE SYSTEMS, METHODS AND SOFTWARE

(75) Inventors: Mark B. Gagner, West Chicago, IL (US); Jim Motyl, Chicago, IL (US); James M. Rasmussen, Chicago, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 1136 days.

(21) Appl. No.: 12/278,857

(22) PCT Filed: Feb. 9, 2007

(86) PCT No.: PCT/US2007/003604

§ 371 (c)(1), (2), (4) Date: Aug. 8, 2008

(87) PCT Pub. No.: WO2007/095135

PCT Pub. Date: Aug. 23, 2007

(65) Prior Publication Data

US 2009/0054136 A1 Feb. 26, 2009

Related U.S. Application Data

(60) Provisional application No. 60/743,274, filed on Feb. 10, 2006, provisional application No. 60/747,234, filed on May 15, 2006.

(51) Int. Cl.

| | |
|---|---|
| ***A63F 13/00*** | (2006.01) |
| ***A63F 9/04*** | (2006.01) |
| ***G06F 17/00*** | (2006.01) |
| ***G06F 19/00*** | (2006.01) |
| *A63F 13/12* | (2006.01) |

(52) U.S. Cl. ................ 463/25; 463/16; 463/20; 463/29; 463/43; 273/138.1; 273/138.2; 273/139; 273/141 A; 713/170; 902/23; 902/38

(58) Field of Classification Search .............. 463/16–23, 463/25–33, 39–43; 273/138.1, 139, 138.2, 273/141 A, 454–456, 460; 705/56–57, 64, 705/67, 72, 74–75, 78–79; 709/203–207, 709/FOR. 113; 713/1, 100, 150, 155, 170, 713/176, 182–184, 186–189, 300, 375, 400, 713/500, 600; 902/2–5, 23, 38, 40

See application file for complete search history.

(56) References Cited

U.S. PATENT DOCUMENTS 4,342,454 A 8/1982 Baer et al.

(Continued)

FOREIGN PATENT DOCUMENTS

WO WO-2007095135 A3 8/2007

OTHER PUBLICATIONS

"International Application Serial No. PCT/US2007/003604 International Search Report mailed Nov. 18, 2008" 5 pgs.

(Continued)

*Primary Examiner* — Arthur O. Hall

(74) *Attorney, Agent, or Firm* — Schwegman Lundberg & Woessner, P.A.

(57) ABSTRACT

In one example embodiment, a wagering game system includes at least one wagering game computer program operative on the wagering game platform to detect a wager. A persistent state manager software component is operative to read or write persistent state data to and from the wagering game computer program and persistent state media. In one embodiment, the persistent state media is a bar-coded ticket, and in another embodiment an electronic data storage device such as a RFID device. A messaging system allows persistent state media devices to interact with the wagering game.

20 Claims, 17 Drawing Sheets

U.S. PATENT DOCUMENTS

| | | | | | |
|---|---|---|---|---|---|
| 4,575,622 | A | * | 3/1986 | Pellegrini | 463/25 |
| 4,752,068 | A | | 6/1988 | Endo | |
| 4,764,666 | A | * | 8/1988 | Bergeron | 463/25 |
| 4,858,930 | A | | 8/1989 | Sato | |
| 4,882,473 | A | * | 11/1989 | Bergeron et al. | 463/25 |
| 4,948,138 | A | | 8/1990 | Pease et al. | |
| 5,014,982 | A | | 5/1991 | Okada et al. | |
| 5,018,736 | A | | 5/1991 | Pearson et al. | |
| 5,179,517 | A | * | 1/1993 | Sarbin et al. | 463/25 |
| 5,265,874 | A | * | 11/1993 | Dickinson et al. | 463/25 |
| 5,292,127 | A | | 3/1994 | Kelly et al. | |
| 5,321,241 | A | * | 6/1994 | Craine | 463/25 |
| 5,370,306 | A | | 12/1994 | Schulze et al. | |
| 5,370,399 | A | | 12/1994 | Liverance | |
| 5,393,057 | A | | 2/1995 | Marnell, II | |
| 5,429,361 | A | | 7/1995 | Raven et al. | |
| 5,470,079 | A | * | 11/1995 | LeStrange et al. | 463/25 |
| 5,533,727 | A | | 7/1996 | DeMar | |
| 5,547,202 | A | | 8/1996 | Tsumura | |
| 5,551,692 | A | | 9/1996 | Pettit et al. | |
| 5,580,053 | A | | 12/1996 | Crouch | |
| 5,580,309 | A | | 12/1996 | Piechowiak et al. | |
| 5,586,766 | A | | 12/1996 | Forte et al. | |
| 5,586,936 | A | | 12/1996 | Bennett et al. | |
| 5,655,961 | A | | 8/1997 | Acres et al. | |
| 5,674,128 | A | * | 10/1997 | Holch et al. | 463/42 |
| 5,702,304 | A | | 12/1997 | Acres et al. | |
| 5,741,183 | A | | 4/1998 | Acres et al. | |
| 5,743,523 | A | | 4/1998 | Kelly et al. | |
| 5,743,800 | A | | 4/1998 | Huard et al. | |
| 5,752,882 | A | | 5/1998 | Acres et al. | |
| 5,761,647 | A | | 6/1998 | Boushy | |
| 5,770,533 | A | | 6/1998 | Franchi | |
| 5,816,918 | A | | 10/1998 | Kelly et al. | |
| 5,820,459 | A | | 10/1998 | Acres et al. | |
| 5,833,540 | A | | 11/1998 | Miodunski et al. | |
| 5,836,817 | A | | 11/1998 | Acres et al. | |
| 5,882,258 | A | | 3/1999 | Kelly et al. | |
| 5,902,983 | A | | 5/1999 | Crevelt et al. | |
| 5,919,091 | A | | 7/1999 | Bell et al. | |
| 5,931,467 | A | | 8/1999 | Kamille | |
| 5,983,196 | A | | 11/1999 | Wendkos | |
| 5,997,401 | A | | 12/1999 | Crawford | |
| 6,007,426 | A | | 12/1999 | Kelly et al. | |
| 6,009,412 | A | | 12/1999 | Storey | |
| 6,015,344 | A | | 1/2000 | Kelly et al. | |
| 6,048,269 | A | | 4/2000 | Burns et al. | |
| 6,061,660 | A | | 5/2000 | Eggleston et al. | |
| 6,068,552 | A | | 5/2000 | Walker et al. | |
| 6,110,041 | A | * | 8/2000 | Walker et al. | 463/20 |
| 6,113,098 | A | | 9/2000 | Adams | |
| 6,113,493 | A | | 9/2000 | Walker et al. | |
| 6,162,122 | A | | 12/2000 | Acres et al. | |
| 6,165,071 | A | | 12/2000 | Weiss | |
| 6,178,408 | B1 | | 1/2001 | Copple et al. | |
| 6,179,710 | B1 | | 1/2001 | Sawyer et al. | |
| 6,193,608 | B1 | * | 2/2001 | Walker et al. | 463/25 |
| 6,203,430 | B1 | | 3/2001 | Walker et al. | |
| 6,227,972 | B1 | * | 5/2001 | Walker et al. | 463/25 |
| 6,231,445 | B1 | | 5/2001 | Acres | |
| 6,244,958 | B1 | | 6/2001 | Acres | |
| 6,251,014 | B1 | * | 6/2001 | Stockdale et al. | 463/16 |
| 6,254,483 | B1 | | 7/2001 | Acres | |
| 6,280,326 | B1 | | 8/2001 | Saunders | |
| 6,293,866 | B1 | | 9/2001 | Walker et al. | |
| 6,302,793 | B1 | | 10/2001 | Fertitta, III et al. | |
| 6,311,976 | B1 | | 11/2001 | Yoseloff et al. | |
| 6,312,334 | B1 | | 11/2001 | Yoseloff | |
| 6,334,613 | B1 | | 1/2002 | Yoseloff | |
| 6,340,331 | B1 | * | 1/2002 | Saunders et al. | 463/25 |
| 6,364,765 | B1 | | 4/2002 | Walker et al. | |
| 6,371,852 | B1 | | 4/2002 | Acres | |
| 6,394,900 | B1 | | 5/2002 | McGlone et al. | |
| 6,394,907 | B1 | | 5/2002 | Rowe | |
| 6,398,650 | B1 | | 6/2002 | Horigami et al. | |
| 6,533,273 | B2 | | 3/2003 | Cole et al. | |
| 6,540,609 | B1 | | 4/2003 | Paige | |
| 6,592,456 | B2 | | 7/2003 | Walker et al. | |
| 6,592,457 | B1 | | 7/2003 | Frohm et al. | |
| 6,605,001 | B1 | | 8/2003 | Tarantino | |
| 6,609,975 | B1 | | 8/2003 | Sawyer et al. | |
| 6,612,575 | B1 | | 9/2003 | Cole et al. | |
| 6,682,421 | B1 | * | 1/2004 | Rowe et al. | 463/25 |
| 6,752,312 | B1 | * | 6/2004 | Chamberlain et al. | 235/375 |
| 6,758,757 | B2 | | 7/2004 | Luciano, Jr. et al. | |
| 6,800,027 | B2 | | 10/2004 | Giobbi et al. | |
| 6,811,486 | B1 | | 11/2004 | Luciano, Jr. | |
| 6,840,860 | B1 | * | 1/2005 | Okuniewicz | 463/35 |
| 6,923,721 | B2 | | 8/2005 | Luciano et al. | |
| 7,182,690 | B2 | * | 2/2007 | Giobbi et al. | 463/24 |
| 7,682,244 | B1 | * | 3/2010 | Luciano et al. | 463/25 |
| 2001/0046893 | A1 | | 11/2001 | Giobbi et al. | |
| 2001/0048193 | A1 | | 12/2001 | Yoseloff et al. | |
| 2002/0074726 | A1 | | 6/2002 | Yoseloff et al. | |
| 2002/0077170 | A1 | | 6/2002 | Johnson et al. | |
| 2002/0093136 | A1 | * | 7/2002 | Moody | 273/139 |
| 2003/0100362 | A1 | * | 5/2003 | Horniak et al. | 463/25 |
| 2004/0209662 | A1 | * | 10/2004 | Wadleigh | 463/16 |

OTHER PUBLICATIONS

"International Application Serial No. PCT/US2007/003604 Written Opinion mailed Nov. 18, 2008" 7 pgs.

* cited by examiner

| MESSAGE | MESSAGE ID* | SOURCE | DESTINATION | DATA | NOTES |
|---|---|---|---|---|---|
| CREATE PERSISTENT STATE MEDIA | MSG_PERSTATE_MEDIA_CREATE | GAME | PERSISTENT STATE MGR. | STATE DATA | |
| DISPENSE PERSISTENT MEDIA | MSG_WKT_DISPENSE | PSM | EDS DEVICE MGR. | STATE DATA | THE PRINTER MANAGER IGNORES THIS MESSAGE. |
| PRINT TICKET | MSG_TKT_PSDPRINT | PSM | PRINTER MGR. | STATE DATA | |
| MEDIA DISPENSED | MSG_WKT_DISPENSED | EDS DEVICE MGR. | PSM | | |
| MEDIA DISPENSED | MSG_PERSTATE_MEDIA_DISPENSED | PSM | GAME | | THE GAME PRESENTS THE "SWIPE" WICKET MESSAGE TO THE PLAYER AS THE RESPONSE TO RECEIVING THIS MESSAGE. *NOTE: THIS MESSAGE IS ONLY SENT IF A EDS DEVICE WAS DISPENSED.* |
| WRITE PERSISTENT DATA | MSG_PERSTATE_WRITE | GAME | PSM | STATE DATA | USED WHEN THE CURRENT GAME WAS STARTED WITH PERSISTENT DATA. |
| WRITE PERSISTENT DATA | MSG_WKT_WRITE | PSM | EDS DEVICE MGR. | STATE DATA | |
| MEDIA WRITTEN/COMPLETED | MSG_WKT_COMPLETE | EDS DEVICE MGR. | PSM | | |
| MEDIA WRITTEN/COMPLETED | MSG_TKT_COMPLETE | PRINTER MGR. | PSM | | |
| MEDIA COMPLETE | MSG_PERSTATE_COMPLETE | PSM | GAME | | THE GAME CLEARS ANY PLAYER PROMPTS |
| PERSISTENT MEDIA READ-IN | MSG_WBA_PERSTATE_READ | BILL/TICKET ACCEPTOR | PSM | STATE DATA | |
| PERSISTENT MEDIA READ-IN | MSG_WKT_PERSTATE_READ | EDS DEVICE MGR | PSM | STATE DATA | |
| PERSISTENT DATA AVAILABLE | MSG_PERSTATE_DATA | PSM | GAME | STATE DATA | THE GAME EITHER ACCEPTS OR REJECTS THE DATA. |
| PERSISTENT DATA ACCEPTED | MSG_PERSTATE_ACCEPT | GAME | PSM | | |
| PERSISTENT DATA REJECTED | MSG_PERSTATE_REJECT | GAME | PSM | | |
| NOTIFY PLAYER ABOUT ACCEPTANCE | MSG_WKT_PERSTATE_ACCEPT | PSM | EDS DEVICE MGR. | | EDS DEVICE READER CHANGES COLOR |
| NOTIFY PLAYER ABOUT REJECTION | MSG_WKT_PERSTATE_REJECT | PSM | EDS DEVICE MGR. | | EDS DEVICE READER CHANGES COLOR |
| NOTIFY PLAYER ABOUT ACCEPTANCE | MSG_WBA_PERSTATE_ACCEPT | PSM | BILL/TICKET ACCEPTOR | | BILL/TICKET ACCEPTOR STACKS THE TICKET(OPTIONAL) |
| NOTIFY PLAYER ABOUT REJECTION | MSG_WBA_PERSTATE_REJECT | PSM | BILL/TICKET ACCEPTOR | | BILL/TICKET ACCEPTOR RETURNS THE TICKET |

FIG. 11A

| MESSAGE | MESSAGE ID* | SOURCE | DESTINATION | DATA | NOTES |
|---|---|---|---|---|---|
| DISPENSER EMPTY | MSG_WKT_DISPEMPTY | EDS DEVICE MGR. | PSM | | THIS RECEIPT OF THIS MESSAGE MAY BE USED ELSEWHERE IN THE GAME. |
| EDS DEVICE PLAYER TIMEOUT | MSG_WKT_PLYR_TIMEOUT | EDS DEVICE MGR. | PSM | | THE PLAYER DID NOT PRESENT THE EDS DEVICE SOON ENOUGH. |
| EDS DEVICE WRITE ERROR | | | | | |
| BAD EDS DEVICE DATA | | | | | |
| TICKET PRINTING ERROR | | | | | |
| TICKET READ ERROR | | | | | |
| CAN'T COMPLETE | | | | | |
| REJECT THE PERSISTENT DATA | MSG_PERSTATE_REJECT | GAME | PSM | | |

*FIG. 11B*

| MESSAGE | MESSAGE ID* | SOURCE | DESTINATION | DATA | NOTES |
|---|---|---|---|---|---|
| CANCEL PERSISTENT STATE OPERATION | MSG_PERSTATE_CANCEL | FRAMEWORK / GAME | PSM | *TBD* | MUST BE SENT *BEFORE* THE PSM COMPLETES THE CREATION OR WRITING OF THE CURRENT PERSISTENT STATE. |
| INITIALIZE OR REINITIALIZE PERSISTENT STATE PERIPHERAL. | MSG_PERSTATE_INIT | FRAMEWORK / GAME | PSM | | |

*FIG. 11C*

PERSISTENT STATE SYSTEMS, METHODS AND SOFTWARE

RELATED APPLICATIONS

This patent application is a U.S. National Stage Filing under 35 U.S.C. 371 from International Patent Application Serial No. PCT/US2007/003604, filed Feb. 9, 2007, and published on Aug. 23, 2007 as WO 2007/095135 A2, which claims the benefit of priority of U.S. Provisional Patent Application Ser. No. 60/743,274 entitled "Persistent State Management," filed on Feb. 10, 2006 and to U.S. Provisional Patent Application Ser. No. 60/747,234 entitled "Persistent State Systems, Methods and Software," filed on May 15, 2006, the contents of which are incorporated herein by reference in their entirety.

The following commonly assigned U.S. patent applications are related, and are herein incorporated by reference in their entirety: "Wagering Game Having Rule Set Modification," Ser. No. 11/289,894, filed on Nov. 30, 2005; "Sharing Game Assets In A Wagering Game Network," Ser. No. 60/700,933, filed on Jul. 20, 2005; "Wagering Game With Changed Game Indicia Over Multiple Gaming Sessions," Ser. No. 60/586,032, filed on Jul. 7, 2004; "Transient or Persistent Game Play in Wagering Games," Ser. No. 60/745,691, filed on Apr. 26, 2006; and "Systems and Methods for Providing Alternative Persistent State Recovery Techniques in a Wagering Game Machine," Ser. No. 60/747,496, filed on May 17, 2006.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

TECHNICAL FIELD

This application relates generally to wagering games and more particularly to methods and apparatus for managing the persistent state of such games.

BACKGROUND

In one type of wagering game machine, the game may include a number of states. Such states may include information related to player assets or other game assets. For example, player assets may include personalized assets, such as account information (e.g., account number, balance, credit limit), credits earned, cards dealt, a game play level, tokens earned, progress in an episodic game, a buddy list, a previous best score or achievement, or a game play statistic. It may be desirable to discontinue play on one gaming machine or a game session, and start up play on the same or a different gaming machine with the same state(s) as the player left off. Such persistent state play information can be used in many different ways to increase the enjoyment of players.

BRIEF DESCRIPTION OF THE FIGURES

The present inventive subject matter is illustrated by way of example and not limitation in the Figures of the accompanying drawings in which:

FIGS. 11A, 11B and 11C illustrate example messages that may be used in a persistent state wagering game system according to example embodiments of the inventive subject matter described herein.

DETAILED DESCRIPTION

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the inventive subject matter, its elements, operation, and application are not limiting as a whole, but serve only to define these example embodiments. The following detailed description does not, therefore, limit embodiments of the inventive subject matter, which are defined only by the appended claims.

Figure 1:
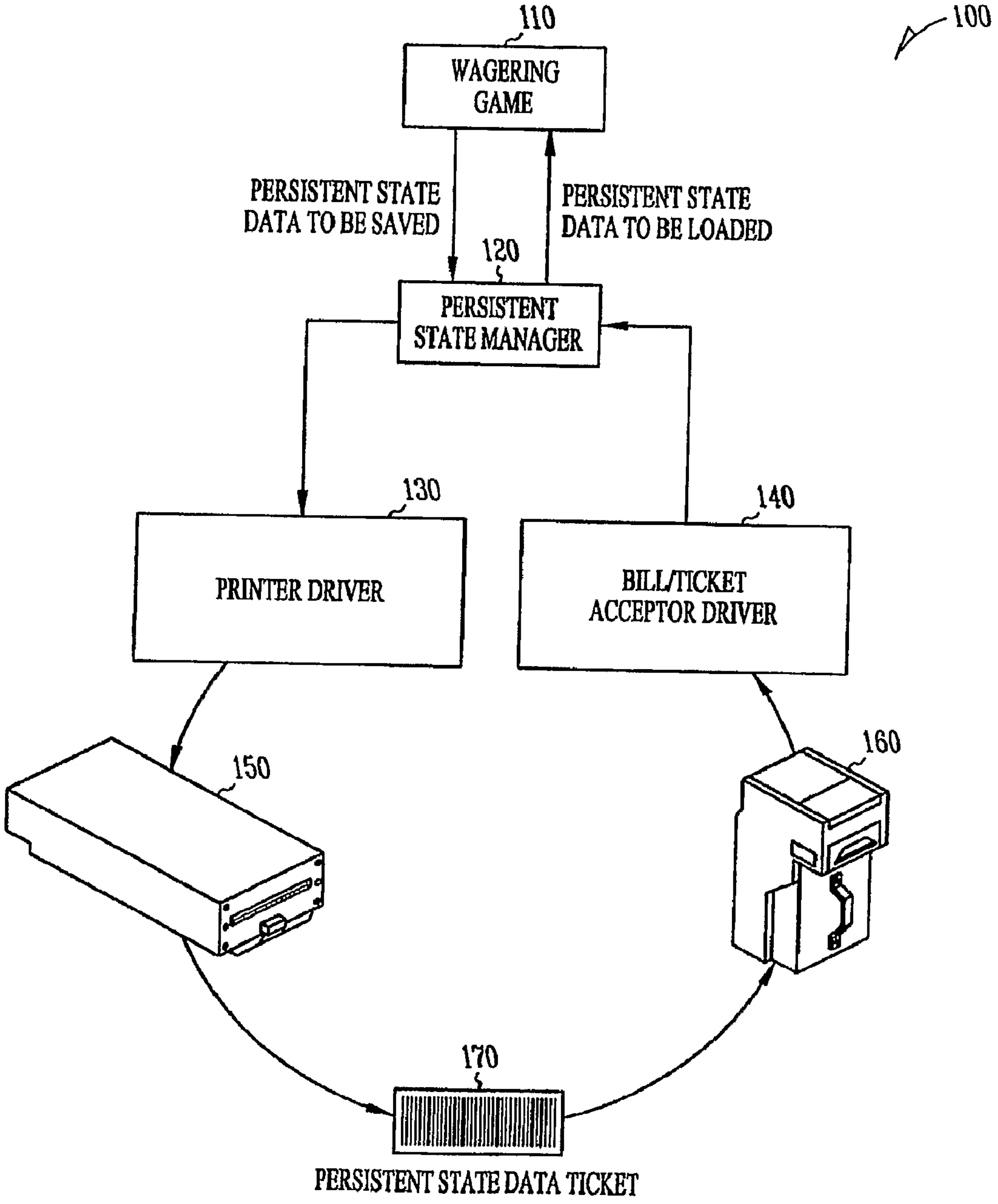
FIGS. 1 and 2 illustrate persistent state wagering game systems according to example embodiments of the inventive subject matter described herein.

Referring now to FIG. 1 there is illustrated a schematic diagram of a first example embodiment of a persistent gaming system 100 according to a first example embodiment of the inventive subject matter. Wagering game software 110 is operative to conduct a wagering game in whole or in part, wherein the wagering game accepts a wager from a player. The wagering game may be, for example, an electromechanical wagering game machine configured to play mechanical slots, or it can be an electronic wagering game configured to play video casino games, such as blackjack, slots, keno, poker, blackjack, roulette, etc. In one example embodiment, the wagering game software 110 receives uses, creates and outputs persistent state data in connection with the play of the wagering game. According to various embodiments, persistent state data includes information related to player assets or game assets. For example, player assets may include personalized assets, such as account information (e.g., account number, balance, credit limit), credits earned, cards dealt, a game play level, tokens earned, progress in an episodic game, a buddy list, a previous best score or achievement, or a game play statistic. A player asset may be represented in a wagering game by a particular game asset. For example, a player might collect trophies (player persistent state assets) over the course of playing a game where the trophies are represented by images of such trophies (game assets) within the game.

A persistent state manager 120 is in communication with the wagering game software 110, a printer driver 130, a bill/ticket acceptor driver 140, a printer 150, and bill/ticket acceptor hardware 160. According to one example embodiment, the persistent state manager 120 is a software entity that is responsible for managing persistent state hardware as described below, for example by negotiating messages between the hardware and the wagering game software 110. According to one example embodiment, the printer 150 may be a thermal ticket printer and the bill/ticket acceptor hardware 160 is a world bill acceptor (WBA) bill validator provided by JCM, Inc., that is capable of both validating paper currency and reading bar-coded tickets, such as one produced by ticket printer 150.

According to one embodiment, the printer driver 130 may control printer 150 to also produce cash-out tickets 170 for the wagering game. The printer driver 130 is further capable of controlling printer 150 to produce a persistent state ticket, wherein persistent state data is stored on the ticket. In one embodiment, this ticket may look similar to a cash-out ticket. In one example embodiment, the bill/ticket acceptor driver 140 is capable of recognizing both cash-out tickets and persistent state data tickets. For example, in one embodiment, the cash out ticket and persistent state data tickets each include 18 digits of data encoded in the bar code. The persistent state data ticket may use, for example, only 14 digits of the 18 digits, and the first two digits of the persistent state data format may be set to “99” or another unique identifier that the bill/ticket acceptor driver 140 can detect to determine when the ticket is a persistent state data ticket and not a cash-out ticket. In one example embodiment, the persistent state data format may take the form: 99-00XX-XXXX-XXXX-XXXX. In another example embodiment the data takes the form of XX-XXXX-XXXX-XXXX and the system distinguishes between persistent state and cash-out tickets based on the different number of digits on the tickets. Persistent state data read from a ticket 170 may be provided by the bill/ticket acceptor driver 140 to the persistent state manager 120, which in turn provides the persistent state data from the ticket 170 to the game software 110. According to another example embodiment, in ticket-in-ticket-out only environments the bill/ticket acceptor hardware 160 may be the only persistent state input device.

Figure 2:
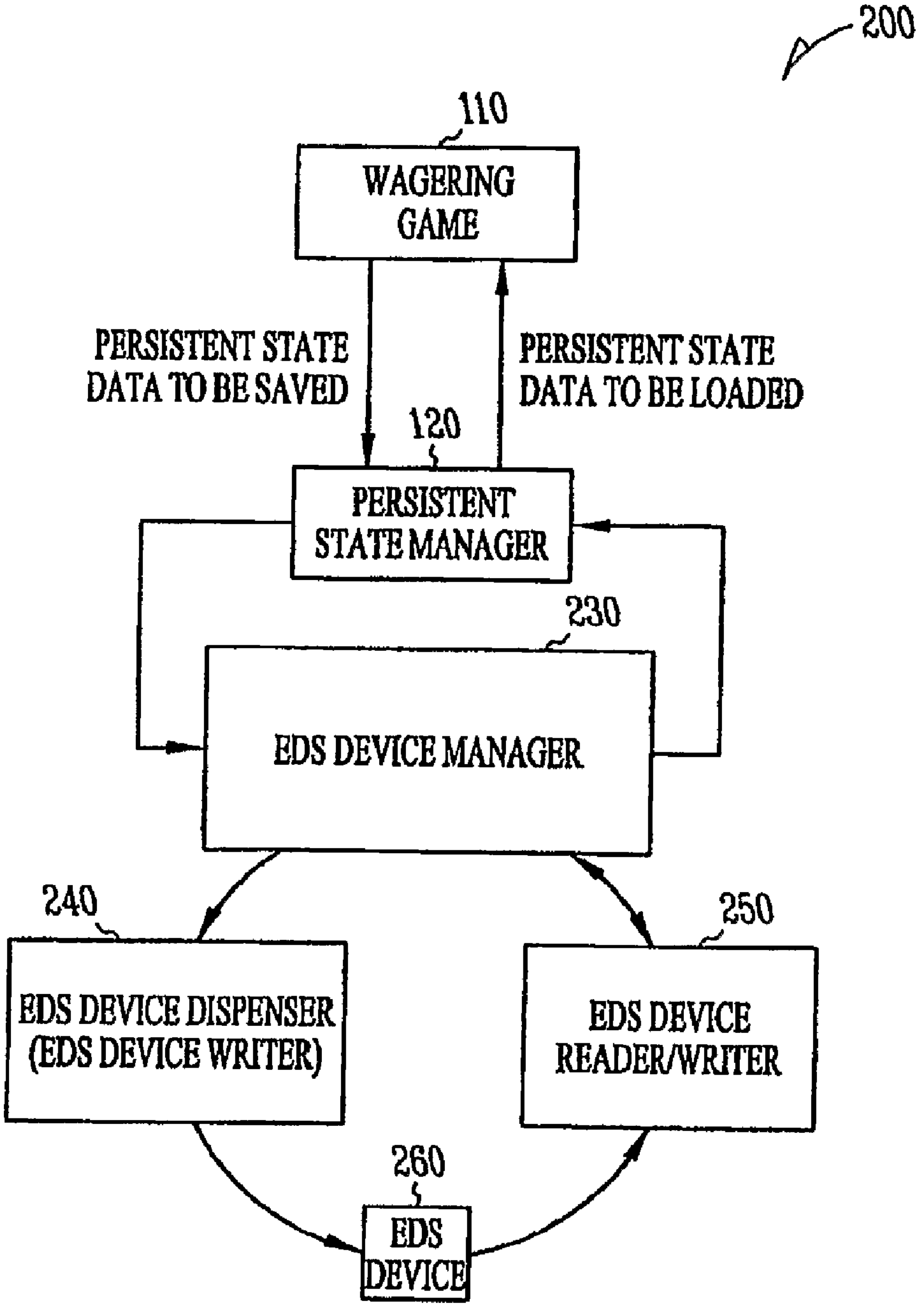

Referring now to FIG. 2, there is illustrated a schematic diagram of an example embodiment of a gaming system 200. As described above with respect to FIG. 1, wagering game software 110 is operative to conduct a wagering game and to receive, use, create, and output persistent state data. In the embodiment of FIG. 2, an electronic data storage (EDS) device 260 is used to store persistent state data. According to one example embodiment, the EDS device 260 is a data storage device using the principles of operation of data storage used in RFID technology, and in particular may contain a transponder with a digital memory chip capable of read-write data storage operations. In another embodiment, ESD device 260 may take the form of a smart card including non-volatile memory. Such smart cards are also sometimes referred to as a chip card or integrated circuit card. A smart card may include electrical contacts, or be contact-less and use RFID induction technology, in order to read and write data.

The persistent state manager 120 is in communication with the wagering game software 210, an EDS device manager 230, a EDS device dispenser 240, and a EDS device read/write hardware 250. According to one example embodiment, the EDS device reader/writer 250 may be an RFID interrogator that includes an antenna packaged with a transceiver and decoder. The interrogator may emit a signal activating the RFID circuits in the RFID media or smart card, so it can read and write data to it. When the EDS device 260 passes through the electromagnetic zone of the interrogator, it detects the interrogator’s activation signal. In a read operation, the interrogator then decodes the data encoded in the EDS device’s integrated circuit and the data is available to be conveyed to other circuits or systems. In a write operation, the interrogator uses RF signals to pass data to the EDS device, which in turn stores the data it in its memory. According to one example embodiment, the EDS device 260 may be a RFID WicketID device provided by IDX, Inc., located in El Dorado Ark., U.S.A. In another embodiment, the read/write hardware 250 may include contacts to make contact with a smart card using contacts, and data can be exchanged through the contacts.

The EDS device manager 230 is capable of controlling EDS device dispenser 240 to dispense a EDS device 260, for example a RFID storage device such as a WicketID, or a smart card. According to one embodiment, the EDS device manager 230 may control EDS device dispenser 240 to dispense a new EDS device 260 from the wagering game to a player as needed, for example if the player does not already have a EDS device 260 on which to store persistent state data for the game software 210. In one embodiment, the EDS device dispenser 240 includes a EDS device writer that writes persistent state data to the EDS device 260 prior to or as it is released to a player from the dispenser. In another embodiment, a player retrieves the dispensed EDS device 260 and places it in proximity of EDS device reader/writer 250, and EDS device manager 230 controls reader/writer 250 to cause persistent state data from game 210 to be written to the EDS device 260. The EDS device reader/writer 250 may also be used to add/replace/remove persistent state data on the EDS device 260. Persistent state data read from a EDS device 260 may be provided by the EDS device manager 230 to the persistent state manager 120, which in turn provides the persistent state data from the EDS device 260 to the game 110. EDS device manager 230 may handle all tasks related to EDS device management and may send and receive persistent state data messages.

In still another example embodiment (not illustrated), the persistent state manager 120 of FIG. 2 may also be connected to a printer device such as device 130 and a bill/ticket acceptor driver such as driver 140, and the system may provide both the ability to print and read persistent state tickets 170, and to dispense, write and read EDS device 260. Persistent state tickets 170, EDS device 260, and any other media used to store persistent state data are collectively referred to herein as “persistent state data media.” Thus, as described above, the persistent state manager 120 provides a layer between the persistent state data media and the wagering game software 110. This layer allows the wagering game software 110 to be unaware of the type of media in use. The wagering game software 110 may, in some embodiments, provide some functionality to assist with player interaction in regards to dispensing the EDS device 260. The wagering game software 110 interface with the persistent state manager 120 interface may then be simplified. For example, in one example embodiment the game software 110 may only have to request the creation of a saved persistent state and the persistent state manager 120 may take care of interacting with the persistent state hardware to save persistent state data to a persistent state data media.

Figure 3A:
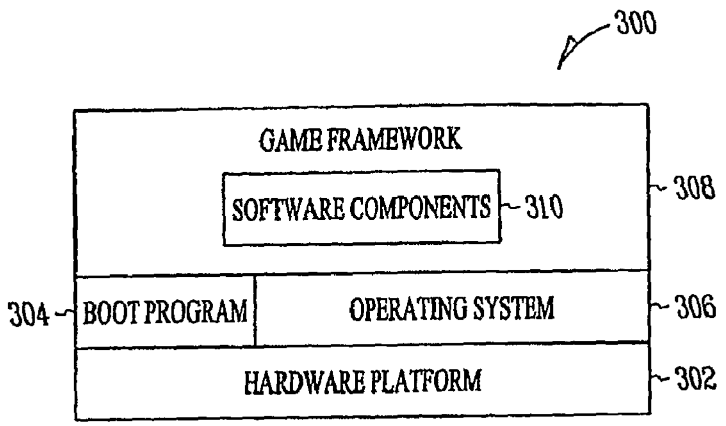
FIG. 3A illustrates an architecture of a wagering game system according to example embodiments of the inventive subject matter described herein.

Referring now to FIG. 3A, there is illustrated a block diagram of an architecture for a wagering game machine 300 including the capabilities of the persistent gaming system 100, persistent gaming system 200, or a combination such capabilities, according to example embodiments of the inventive subject matter. The wagering game machine 300 may be used in gaming establishments, such as casinos. According to some example embodiments, the wagering game machine 300 can be any type of wagering game machine and can have varying structures and methods of operation. For example, the wagering game machine 300 can be an electromechanical wagering game machine configured to play mechanical slots, or it can be an electronic wagering game machine configured to play video casino games, such as blackjack, slots, keno, poker, blackjack, roulette, etc. As shown in FIG. 3A, the wagering game architecture includes a hardware platform 302, a boot program 304, an operating system 306, and a game framework 308 that includes one or more wagering game software components 310. According to one example embodiment, the game software components 310 include the software components of the persistent state gaming system 100, including but not limited to the wagering game software 110, the persistent state manager 120, the printer driver 130, the bill/ticket acceptor driver 140, and/or the EDS device manager 230. According to another example embodiment, one or more of the software components of the persistent gaming system 100 may be provided as part of the operating system 306 or other software used in the wagering game system 300. Game framework 308 may also include standardized game software components, and game software components that are unique for a particular wagering game. In one example embodiment, the wagering game software components 310 may include software operative in connection with the hardware platform 302 and operating system 306 to present wagering games, such as video poker, video black jack, video slots, video lottery, etc., in whole or part. According to another example embodiment, the software components 310 may include software operative to accept a wager from a player.

Figure 3B:
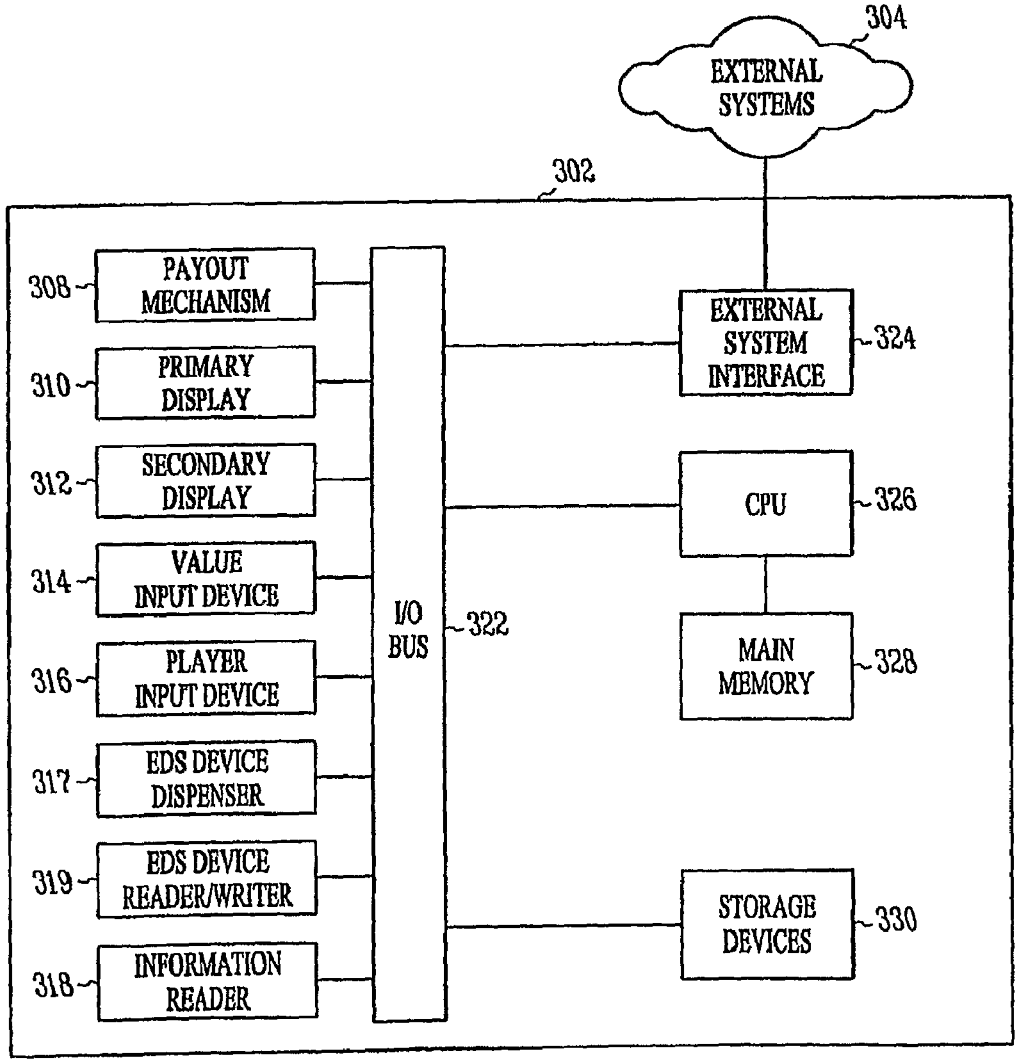
FIG. 3B illustrates a wagering game hardware platform according to one example embodiment of the inventive subject matter described herein.

Referring now to FIG. 3B, an example embodiment of a wagering game machine hardware platform 302 is described. Platform 302 may include a central processing unit (CPU) 326 connected to a main memory 328, which may be any type of addressable memory or storage. The CPU 326 is also connected to an input/output (I/O) bus 322, which facilitates communication between the wagering game machine's components. The I/O bus 322 is connected to a payout mechanism 308, primary display 310, secondary display 312, value input device 314, player input device 316, information reader 318, EDS device dispenser 317, EDS device reader/writer 319, and storage devices 330. According to one example embodiment, the value input device is a WBA bill validator such as validator 160 referred to in FIG. 1, and the value output device includes a printer capable of printing bar coded tickets, such as printer 150 referred to in FIG. 1. According to another example embodiment, the EDS device dispenser 317 provides the capabilities of EDS device dispenser 240 and EDS device reader/writer 250 referred to in FIG. 2. In another embodiment, EDS device dispenser 317 and EDS device reader/writer 250 are not included in wagering game machine 300. Storage devices 330 may include any type of storage device including but not limited to magnetic storage media, CD-ROM, Flash memory, firmware or RAM. The player input device 316 can include the value input device 314 to the extent the player input device 316 is used to place wagers. The I/O bus 322 is also connected to an external system interface 324, which is connected to external systems 304 (e.g., wagering game networks). In one embodiment, the wagering game machine hardware platform 302 can include additional peripheral devices and/or more than one of each component shown in FIG. 3B. For example, in one embodiment, the wagering game machine hardware platform 302 can include multiple external system interfaces 324 and multiple CPUs 326. In one embodiment, any of the components can be integrated or subdivided. Additionally, in one embodiment, the components of the wagering game machine hardware platform 302 can be interconnected according to any suitable interconnection architecture (e.g., directly connected, hypercube, etc.).

In one embodiment, any of the wagering game software components 310 of the wagering game machine 300 may be stored and executed from any machine readable media provided in or accessed by the hardware platform 302, including for example storage devices 330 or memory 328. For example, in one embodiment at least some of the wagering game software components 310 are stored in the storage devices 330 at least some of the time, and the same or others of the software components 310 are loaded and accessed from the main memory 328 at least some of the time.

Figure 3C:
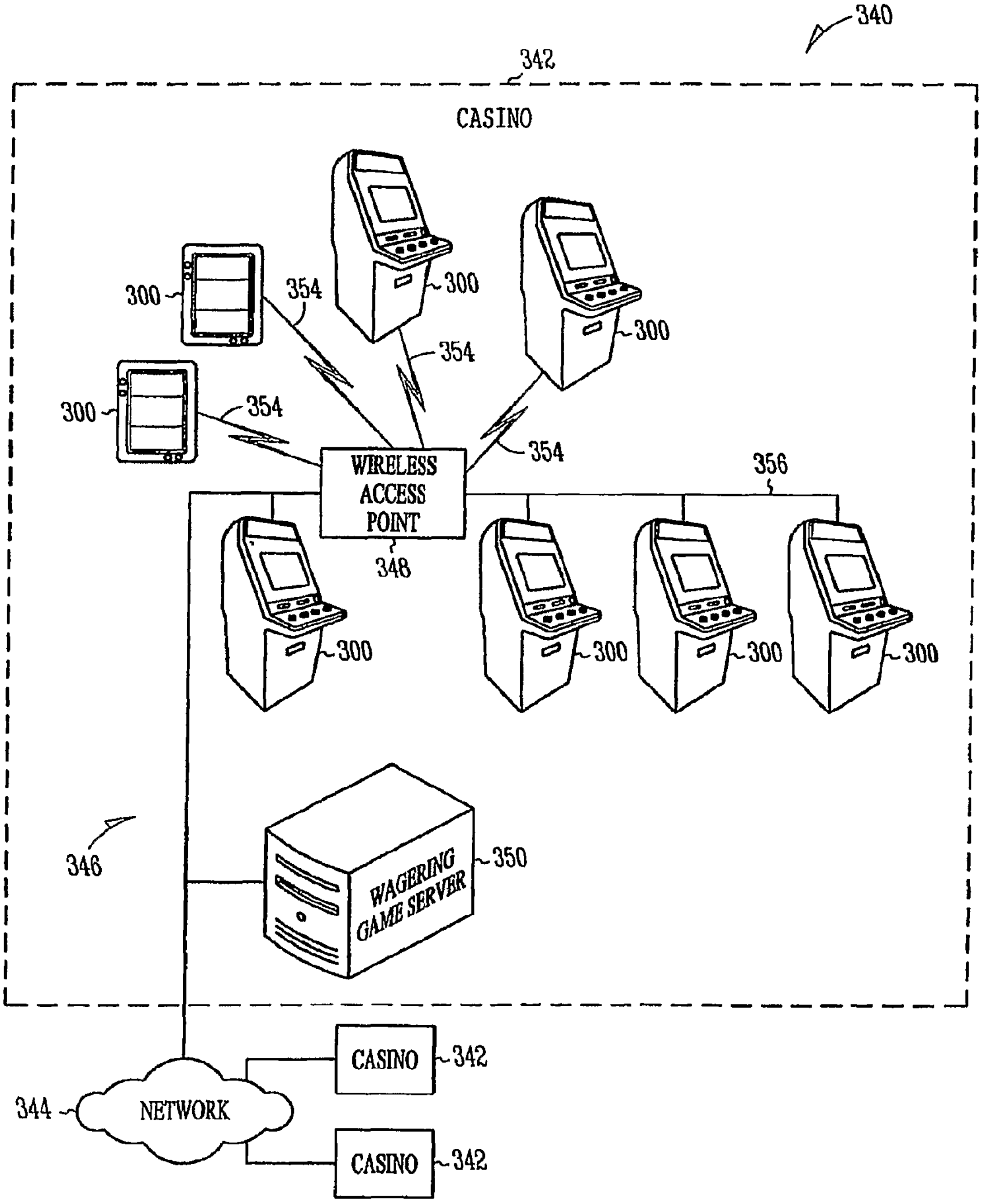
FIG. 3C illustrates a wagering game network according to one example embodiment of the inventive subject matter described herein.

Referring now to FIG. 3C there is illustrated an example embodiment of how a plurality of wagering game machines 300 can be connected in a wagering game network 340. FIG. 3C is a block diagram illustrating a wagering game network 340, according to example embodiments of the inventive subject matter described herein. The wagering game network 340 includes a plurality of casinos 342 connected to a communications network 344. Each of the plurality of casinos 342 includes a local area network 346, which includes a wireless access point 348, wagering game machines 300, and a wagering game server 350 that can serve wagering games over the local area network 346. As such, the local area network 346 includes wireless communication links 354 and wired communication links 356. The wired and wireless communication links can employ any suitable connection technology, such as Bluetooth, 802.11, Ethernet, public switched telephone networks, SONET, etc. In one embodiment, the wagering game server can server wagering games and/or distribute content to devices located in other casinos 342 or at other locations on the network 344. Thus, the wagering game machines 300 and wagering game server 350 can include hardware and machine-readable media including instructions for performing the operations described herein.

The wagering game machines 300 described herein can take any suitable form, such as floor standing models, handheld mobile units, bar-top models, workstation-type console models, etc. Further, the wagering game machines 300 can be primarily dedicated for use in conducting wagering games, or can include non-dedicated devices, such as mobile phones, personal digital assistants, personal computers, etc. In one embodiment, the wagering game network 340 can include other network devices, such as accounting servers, wide area progressive servers, player tracking servers, and/or other devices suitable for use in connection with embodiments of the inventive subject matter. In other embodiments, any of the wagering game machines 300 can take the form of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

Figure 3D:
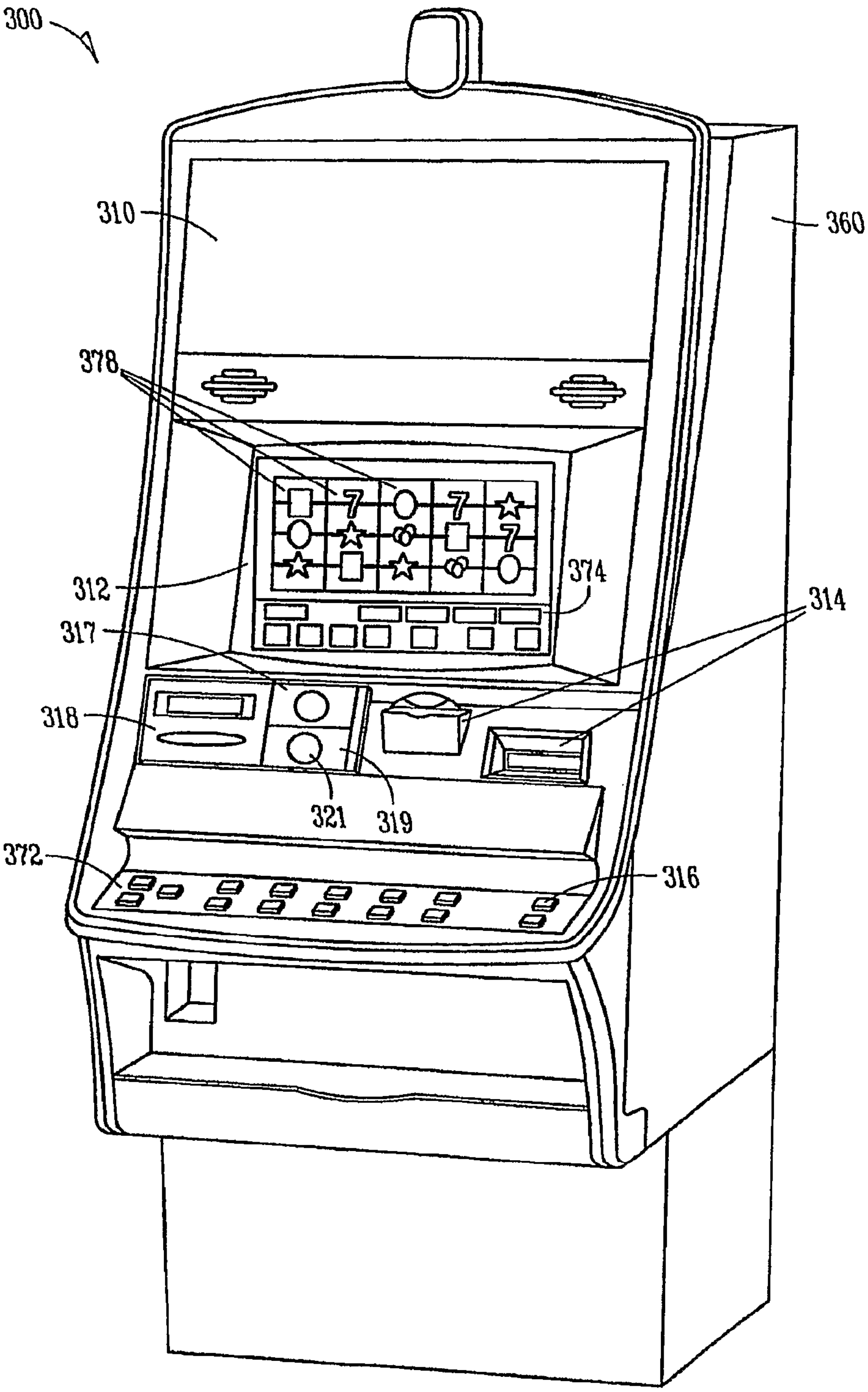
FIG. 3D illustrates a perspective view of the exterior of a wagering game according to one example embodiment of the inventive subject matter described herein.

Referring now to FIG. 3D, there is illustrated a perspective view of the cabinet and exterior aspects of a wagering game machine 300, according to example embodiments of the inventive subject matter. The wagering game machine 300 comprises a housing 360 and includes input devices, including value input devices 314 and a player input device 316. For output, the wagering game machine 300 includes a primary display 310 for displaying information about a basic wagering game. The primary display 310 can also display information about a bonus wagering game and a progressive wagering game. The wagering game machine 300 also includes a secondary display 312 for displaying wagering game events, wagering game outcomes, and/or signage information. While some components of the wagering game machine 300 are described herein, numerous other elements can exist and can be used in any number or combination to create varying forms of the wagering game machine 300.

The value input devices 314 can take any suitable form and can be located on the front of the housing 360. The value input devices 314 can receive currency and/or credits inserted by a player. The value input devices 314 can include coin acceptors for receiving coin currency and bill acceptors for receiving paper currency. Furthermore, the value input devices 314 can include ticket readers or barcode scanners for reading information stored on vouchers, cards, or other tangible portable storage devices. The vouchers or cards can authorize access to central accounts, which can transfer money to the wagering game machine 300. The EDS device dispenser 317 includes, in one example embodiment, an inventory of EDS device devices 260 (FIG. 2) that can be dispensed to a player, and in at least one example embodiment, may include structure and function suitable to perform any of the operations described herein elsewhere. In addition, the EDS device reader/writer 319 is positioned such that at read/write "head" area 321 is positioned so as to allow a player to position a EDS device 260 close enough to perform read or write operations.

The player input device 316 comprises a plurality of push buttons on a button panel 372 for operating the wagering game machine 300. In addition, or alternatively, the player input device 316 can comprise a touch screen 374 mounted in close proximity to the primary display 310 and/or secondary display 312. The various components of the wagering game machine 300 can be connected directly to, or contained within, the housing 360. Alternatively, some of the wagering game machine's components can be located outside of the housing 360, while being communicatively coupled with the wagering game machine 300 using any suitable wired or wireless communication technology.

The operation of the basic wagering game can be displayed to the player on the primary display 310. The primary display 310 can also display a bonus game associated with the basic wagering game. The primary display 310 can include a cathode ray tube (CRT), a high resolution liquid crystal display (LCD), a plasma display, light emitting diodes (LEDs), or any other type of display suitable for use in the wagering game machine 300. Alternatively, the primary display 310 can include a number of mechanical reels to display the outcome. In FIG. 3D, the wagering game machine 300 is an "upright" version in which the primary display 310 is oriented vertically relative to the player. Alternatively, the wagering game machine can be a "slant-top" version in which the primary display 310 is slanted at about a thirty-degree angle toward the player of the wagering game machine 300. In yet another embodiment, the wagering game machine 300 can exhibit any suitable form factor, such as a free standing model, bar-top model, mobile handheld model, or workstation console model.

A player begins playing a basic wagering game by making a wager via the value input device 314. The player can initiate play by using the player input device's buttons 372 or touch screen 374. The basic game can include arranging a plurality of symbols along a payline 378, which indicates one or more outcomes of the basic game. Such outcomes can be randomly selected in response to player input. At least one of the outcomes, which can include any variation or combination of symbols, can trigger a bonus game. In some embodiments, the wagering game machine 300 can also include an information reader 318, which can include a card reader, ticket reader, bar code scanner, RFID transceiver, or computer readable storage medium interface. In some embodiments, the information reader 318 can be used to award complimentary services, restore game assets, track player habits, etc.

Figure 4:
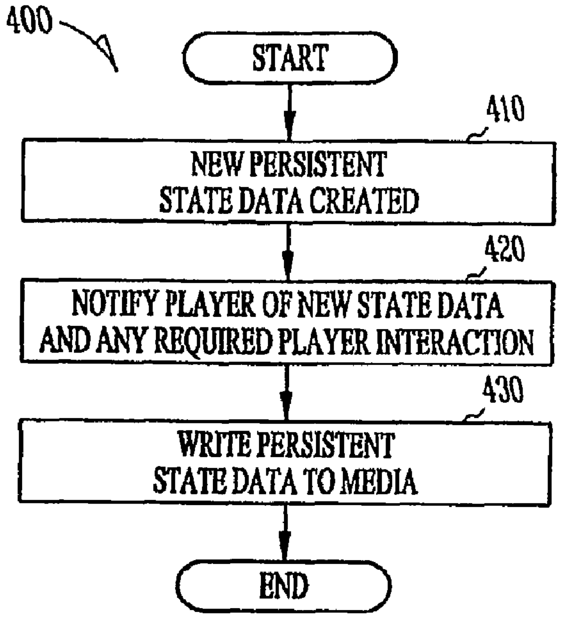
FIGS. 4 and 5 illustrate methods for saving and retrieving persistent state date according to example embodiments of the inventive subject matter described herein.

Referring now to FIG. 4, there is illustrated a first example embodiment of a method 400 according to the inventive subject matter wherein new persistent state data is created 410 on a wagering game, the player is notified of a new state or data that can be saved 420, and any required player interaction is obtained, and the persistent state data is written 430 to the persistent state data media.

Figure 5:
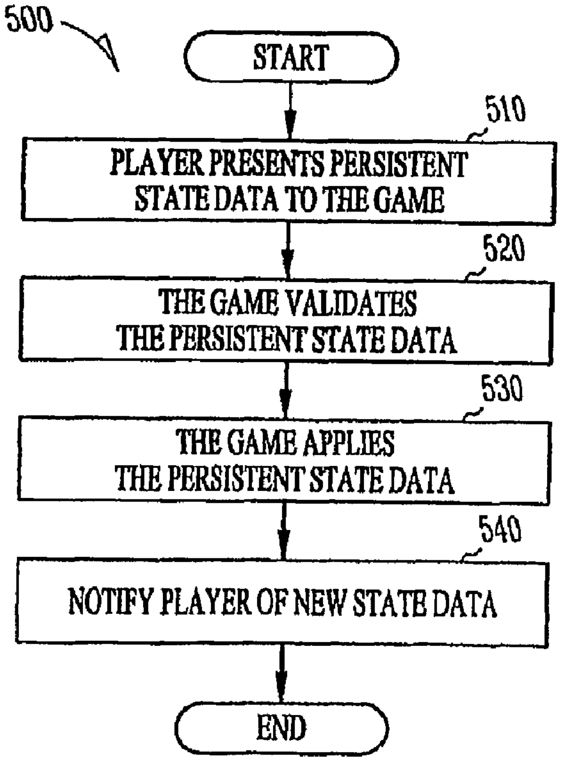

Referring now to FIG. 5, there is illustrated a first example embodiment of a method 500 according to the inventive subject matter wherein a player presents 510 persistent state data to be loaded into a wagering game. The wagering game validates 520 the persistent state data, and the game applies 530 the persistent state data to the game. Finally, the player is notified 540 that the persistent state data has been successfully applied. Persistent state data may be applied to a wagering game by loading the data into the game such that it becomes active in the game and establishes the corresponding states of the game in accordance with the loaded persistent state data. This operation may also include unlocking, presenting or altering game assets based on the persistent state data. For example, presenting or making available images depicting trophies earned by the player or representing the player's progress or accomplishments within the wagering game.

Thus, as described above, there are at least three operations performed by the persistent state manager 120 including media dispersal (EDS device 260 for example), persistent state data media initialization and writing (ticket 170 and EDS device 260), and retrieval of persistent state data from the media. In one example embodiment, the persistent state data is assembled or created by the wagering game software 110. The wagering game software 110 may then request that the persistent state data be written to the persistent state data media. The wagering game software 110 may decide if a EDS device 260 needs to be dispensed. In one example embodiment, even if EDS device dispenser 240 is disabled, the wagering game software 110 can request dispense, and the persistent state manager 120 may ignore the message. According to one example embodiment, the decision to enable or disable the operation of the EDS device dispenser 240 may be made in one or more of the following situations: a) at set-up time via an administration screen on the wagering game display or on a remote workstation; b) at power-up based upon administrative settings or jurisdictional read only memory (ROM) settings; 3) at run-time based upon equipment detection during initialization; or 4) if the EDS device dispenser becomes unavailable due to being empty. According to one example embodiment, although the persistent state manager may be aware of devices in its environment, it does not send or receive device specific messages. In this embodiment, persistent state messages may be 'generic' and may be used without having to be aware of related or associated hardware. The EDS device manager 230 may be responsible for retaining new persistent state data until a player passes a EDS device 260 over the EDS device reader/writer 250. However if a reader/writer is part of the dispenser 240, the EDS device manager 230 may write the persistent state data to the EDS device 260 as it is dispensed. According to one example embodiment, a EDS device dispenser 240 may be capable of "holding" a new EDS device 260 and "releasing" it via separate operations. This allows for a EDS device reader/writer 250 to be mounted at or near the exit of the dispenser 240. In this embodiment, the dispenser 240 holds the EDS device 260 near the reader/writer 250 for a time sufficient to initialize and load the EDS device 260 with persistent state data, and thereafter releases it into a hopper or collection area from where it can be taken by the player.

Figure 6:
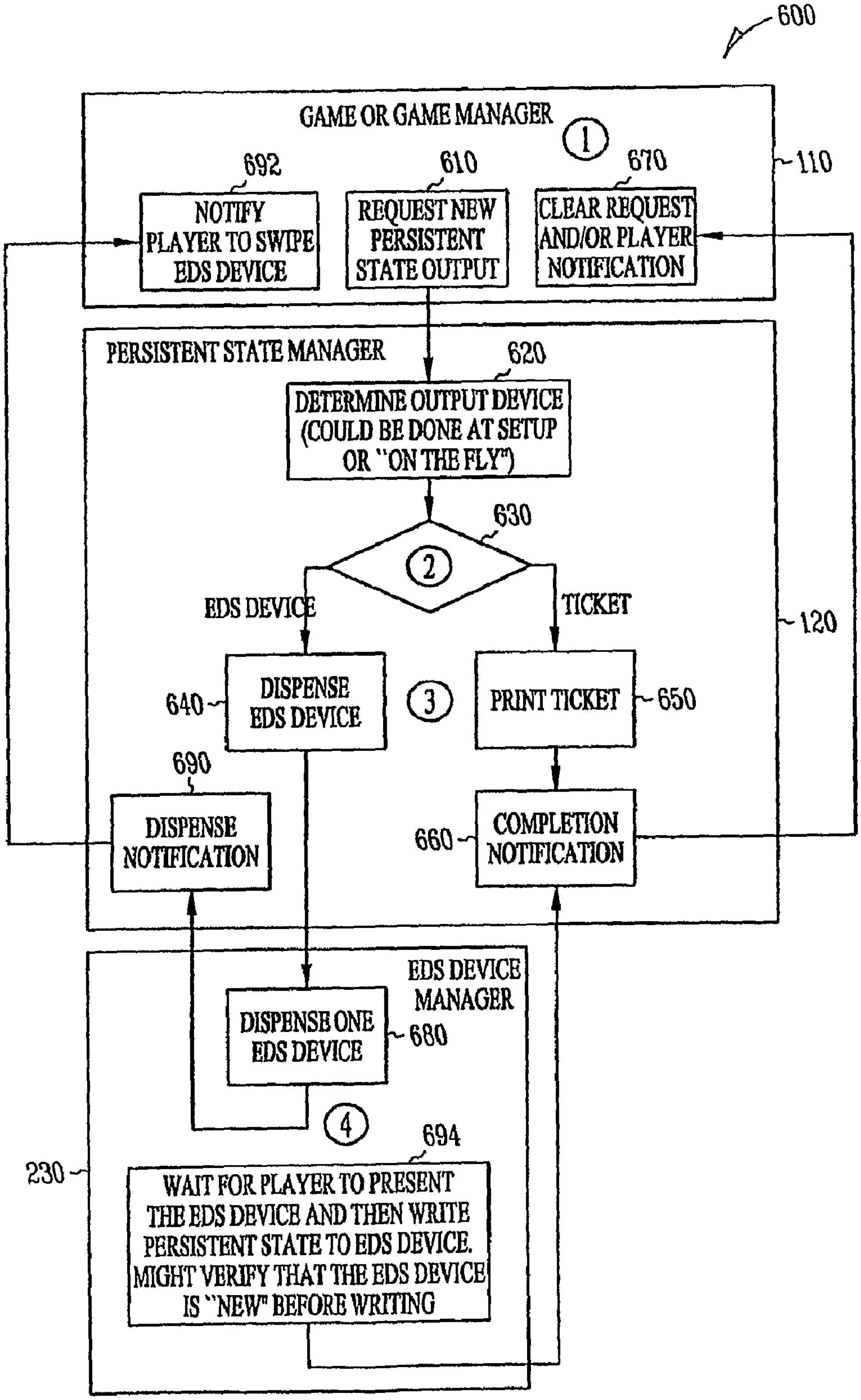
FIGS. 6 and 7 illustrate methods for saving and retrieving persistent state date according to example embodiments of the inventive subject matter described herein.

Referring now to FIG. 6, there is illustrated a method 600 for handling a request to save persistent state data on persistent state data media such as a ticket 170 or a EDS device 260. A request 610 is made for a "new" output of persistent state data. The appropriate output device is determined 620, either at the time the output is requested, or at an earlier time, for example when the system is initialized. If 630 the output is to a EDS device, the EDS device dispenser 240 dispenses 640 a EDS device. If the output is to a ticket, the ticket is printed 650, and a completion notification 660 is sent to the game or game manager and the request is cleared and/or the player is notified 670. In the case of a EDS device output, a EDS device is dispensed 680 and a dispense notification 690 is sent to the game or game manager and a message is displayed 692 to a player of the wagering game to instruct them to take the EDS device and present it to the EDS device reader/writer, which then writes 694 the persistent state data to the EDS device. In one example embodiment, the EDS device is verified as new prior to writing the persistent state data thereto. Once the EDS device is written, a completion notification 660 is sent to the game or game manager and the request is cleared and/or the player is notified 670.

Figure 7:
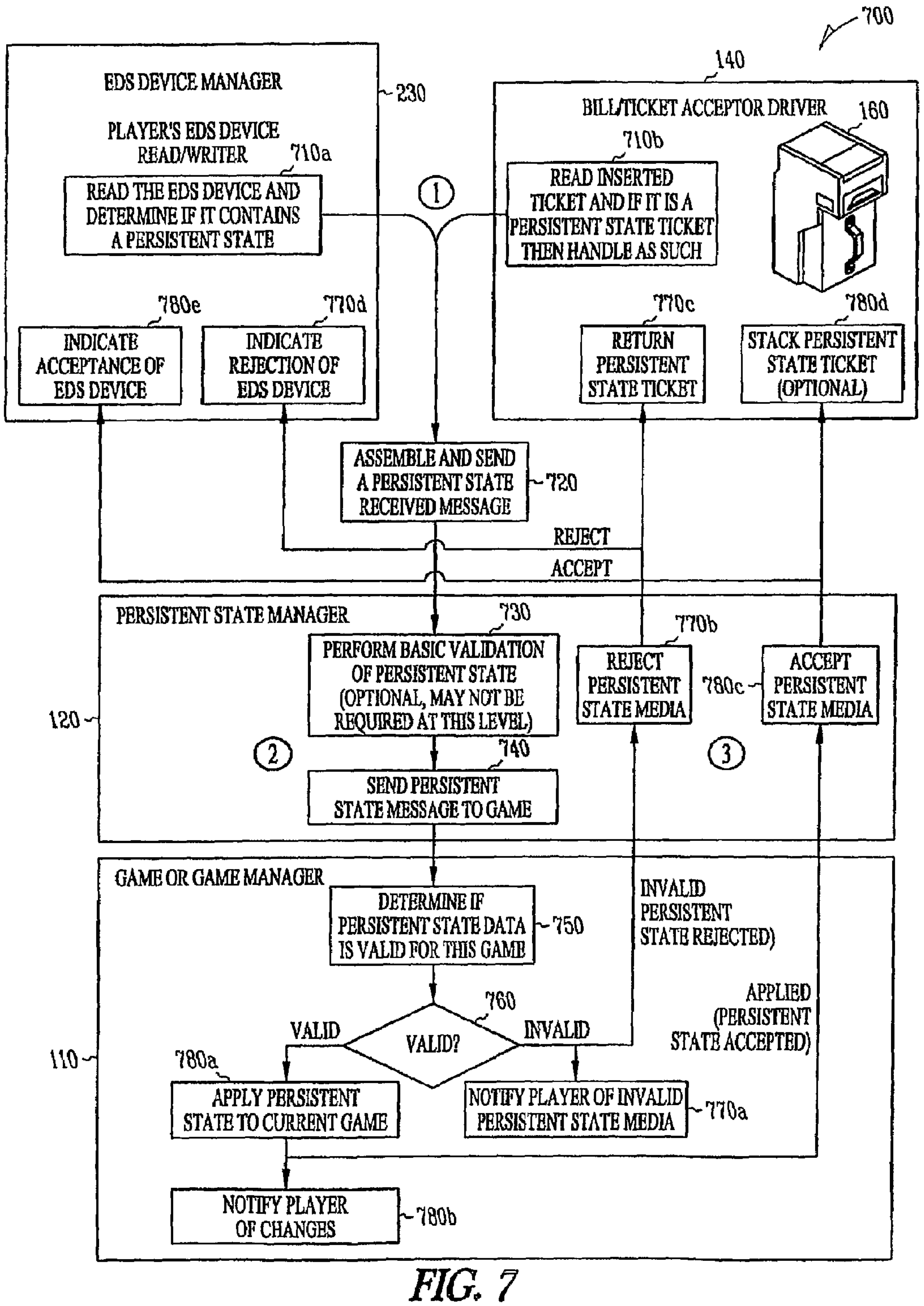

Referring now to FIG. 7, there is illustrated a method 700 according to one example embodiment of the inventive subject matter. If the persistent state data is presented using a EDS device, a EDS device is read 710*a* and the EDS device manager 230 determines if it has a persistent state. If it does, the EDS device manager assembles 230 and sends a Persistent State Received message 720 to the persistent state manager 120. If the persistent state data is presented as a ticket, the persistent state data is read 710*b* from the ticket and the bill/ticket acceptor driver 140 assembles and sends a Persistent State Received message 720 to the persistent state manager 120. Basic validation of the persistent state data is performed 730 (or optionally this validation is not performed at this level) in the persistent state manager 120. The persistent state manager 120 in turn sends 740 a persistent state message to the wagering game software 110 or game manager software. It is then determined 750 if the persistent state data is valid for the game software 110. If 760 it is invalid, the player is notified 770*a* and the persistent state media is rejected 770*b* by the persistent state manager 120, and the media is returned 770*c* from the WBA validator 160 if a ticket or an indication 770*d* is given to the EDS device manager and player if the data from the EDS device is rejected. If valid, the persistent state is applied 780*a* and the player is notified 780*b* of the changes to the states of the wagering game software 110. The persistent state manager 120 in turn determines to accept 780*c* the persistent state media. If the media is a ticket, the ticket may be stacked 780*d* in the bill/ticket acceptor 160, under control of the bill/ticket acceptor driver 140. If the media is a EDS device, an indication of acceptance is given to the EDS device manager 780*e*.

According to one example embodiment, the EDS device reader/writer 250 and bill/ticket acceptor 160 may send the same message, which contains the notification of a new state as well as the state data. The persistent state manager 120 may not require knowledge of where the data originated. In one example embodiment, a checksum or CRC of the persistent state data may be used and checked to determine if data is valid. Otherwise, in one example embodiment, the persistent state manager 120 may not perform any other validation steps. Further, the wagering game software 110 only has to indicate to the persistent state manager 120 whether or not to accept the persistent state media. It may for example in this embodiment handle the appropriate action for the media used. Thus, according to another example embodiment, the persistent state manager 120 may not require any knowledge or awareness of the attached type of persistent state hardware, for example whether it is a ticket or EDS device or some other form of media.

Figure 8:
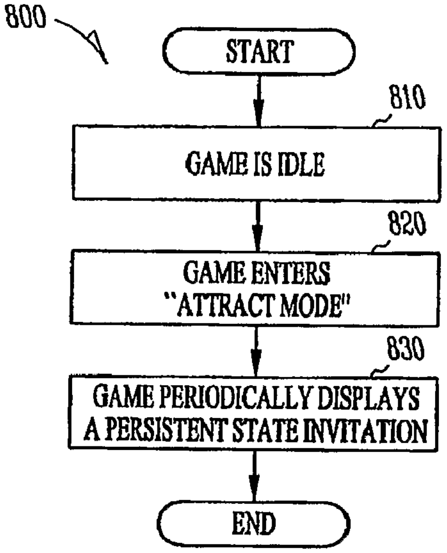
FIGS. 8, 9 and 10 illustrate methods for attract mode, loading persistent state data, and saving persistent state data in a wagering game according to example embodiments of the inventive subject matter described herein.

Referring now to FIG. 8, there is illustrated a flow chart of an example embodiment 800 of the operation of a wagering game in an idle mode. According to this embodiment, the game is idle 810, then enters attract mode 820 and periodically displays an invitation 830 to load persistent state data into the game.

Figure 9:
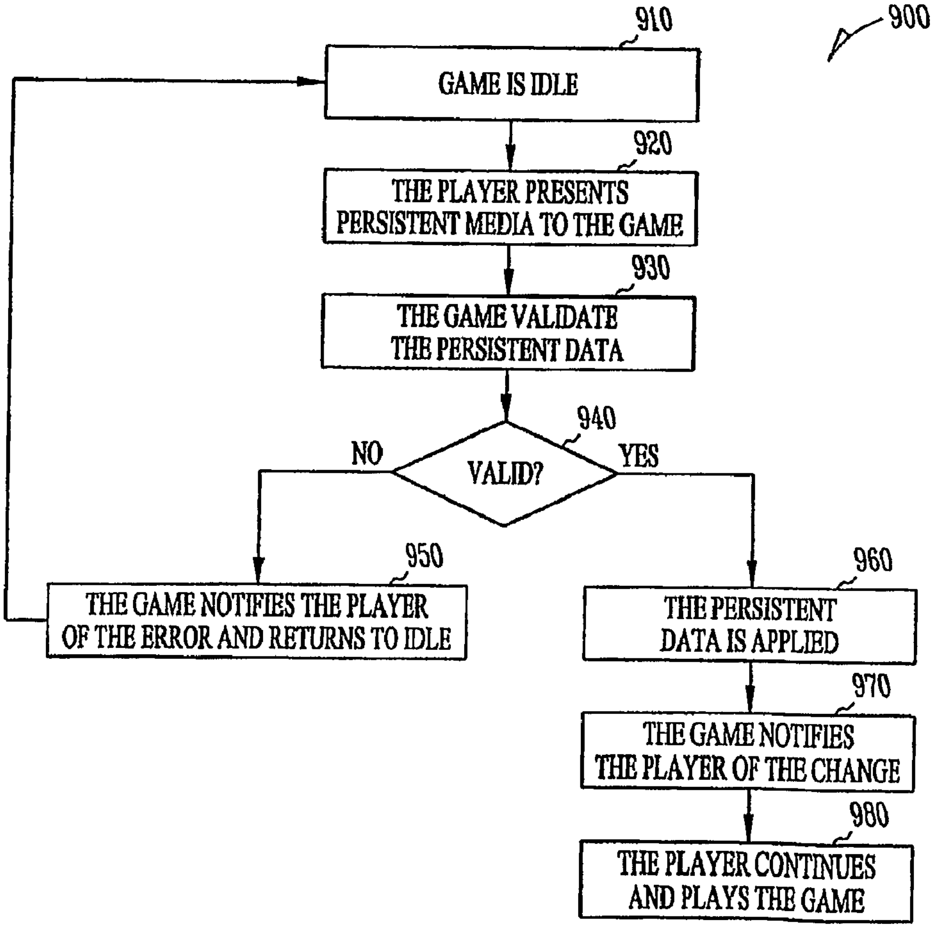

Referring now to FIG. 9, there is illustrated an example embodiment 900 of a method wherein a game is in an idle mode 910 and a player presents 920 persistent state media to the wagering game. The persistent state data is read and validated 930, and if 940 it is valid, the data is applied 960, the game notifies 970 the player, and the player continues and plays 980 the game. In an embodiment, the player may be prompted for a security code to unlock or access the persistent state data. The security code may include an alphanumeric string (e.g., the player's name, social security number, or some arbitrary username) or an icon (e.g., a pictorial representation of one of the game's characters or an identifiable insignia, mark, or graphic from the game's context). If the data is not valid or if the security code is not recognized, the game notifies 950 the player and the game returns to idle mode.

Figure 10:
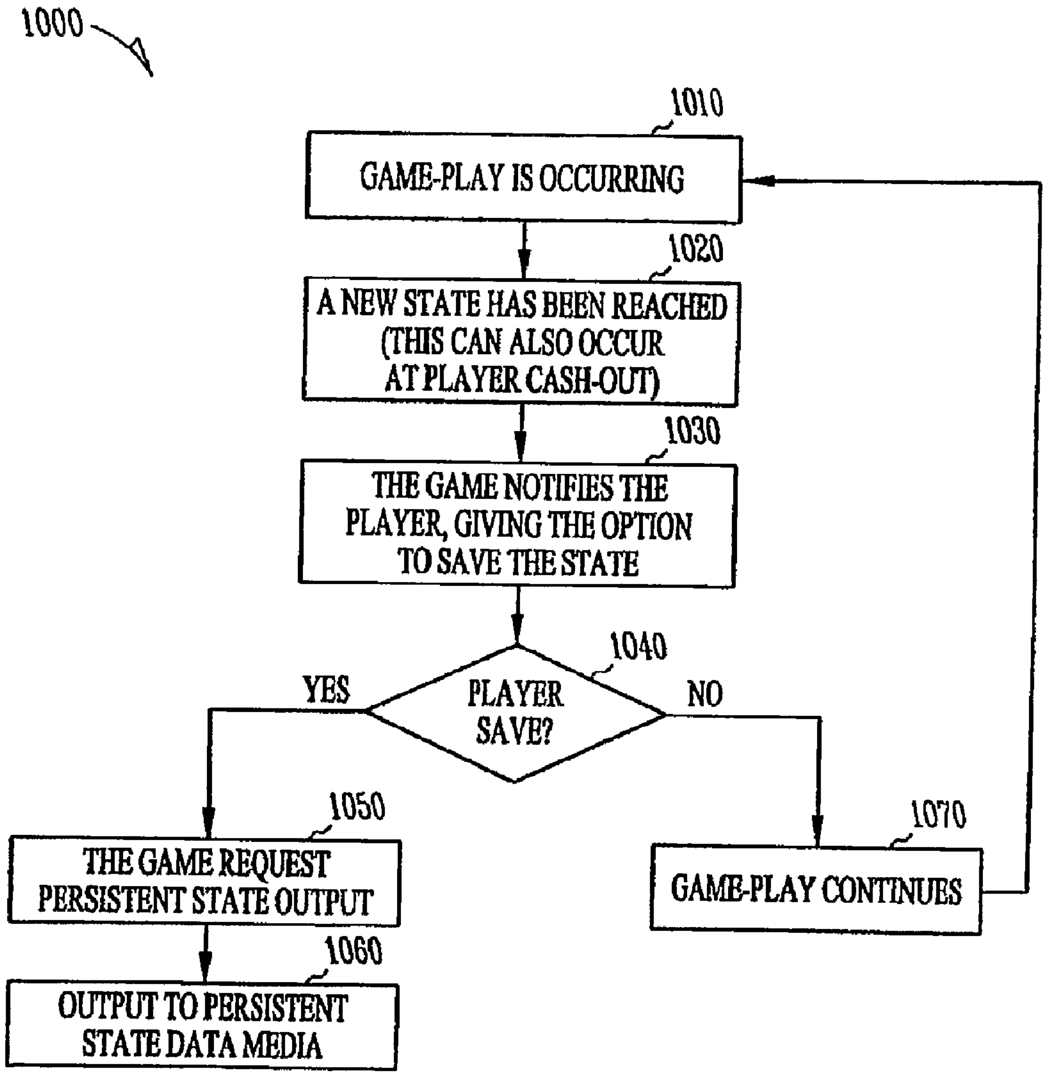

Referring now to FIG. 10, there is illustrated an example embodiment 1000 of saving persistent state data. While game play is occurring 1010, a new persistent state is reached 1020 (or this can be reached at cash-out) and the wagering game notifies 1030 the player that a new state is reached and that they have the option of saving it. If 1040 the player elects to save it, the game requests 1050 a persistent state data output and the data is output 1060 to a persistent state data media such as a EDS device or ticket as described above. In an embodiment, the player is prompted for a security code. The security code may include an icon, an alphanumeric string, or a combination of an icon and string. The security code may be checked to ensure that it is unique to the player. When resuming game play, as described in FIG. 9, the player may be prompted for the security code. If the player declines to save the data, game play continues 1070.

Referring now to FIGS. 11A, 11B and 11C, there is illustrated example persistent state messages that may be used to communicate between the various software and hardware components of the systems described herein. The message, message ID, source of the message, destination for the message, data in the message, and notes are indicated in the columns of the table from left to right, respectively. As used in the table, "Message ID" refers to IDs used to identify the messages. They are provided for reference only and may be changed without departing from the inventive subject matter. PSM means persistent state manager. "State data" refers to the persistent state data. "Game" refers to any or combination of the game application 110, game manager or framework. FIG. 11B illustrates a plurality of potential error messages, their source, destination, and meaning. According to one example embodiment potential errors that can be handled with the error messages include: i) the dispenser is out of EDS device; ii) the EDS device manager 230 timed out waiting for the player to present their EDS device; iii) the EDS device did not accept the persistent state data; iv) the EDS device data is corrupt; v) the persistent state ticket did not print (this error occurs while printing the ticket); vi) printer errors that occur prior to printing a persistent state ticket (may be reported via a tilt); vii) the WBA couldn't read the persistent state ticket; viii) the persistent state manager 120 can't complete a write persistent data request—this may follow a request to create or write a EDS device or ticket when the persistent state manger 120 is unable complete the request due to an error downstream from it; or ix) the persistent data was rejected by the game (or game framework). In addition, a printer message, for example taking the form PrintPerState (persistent_state*p), may also be used to communicate to the printer driver 130 to print a persistent state.

Figure 12:
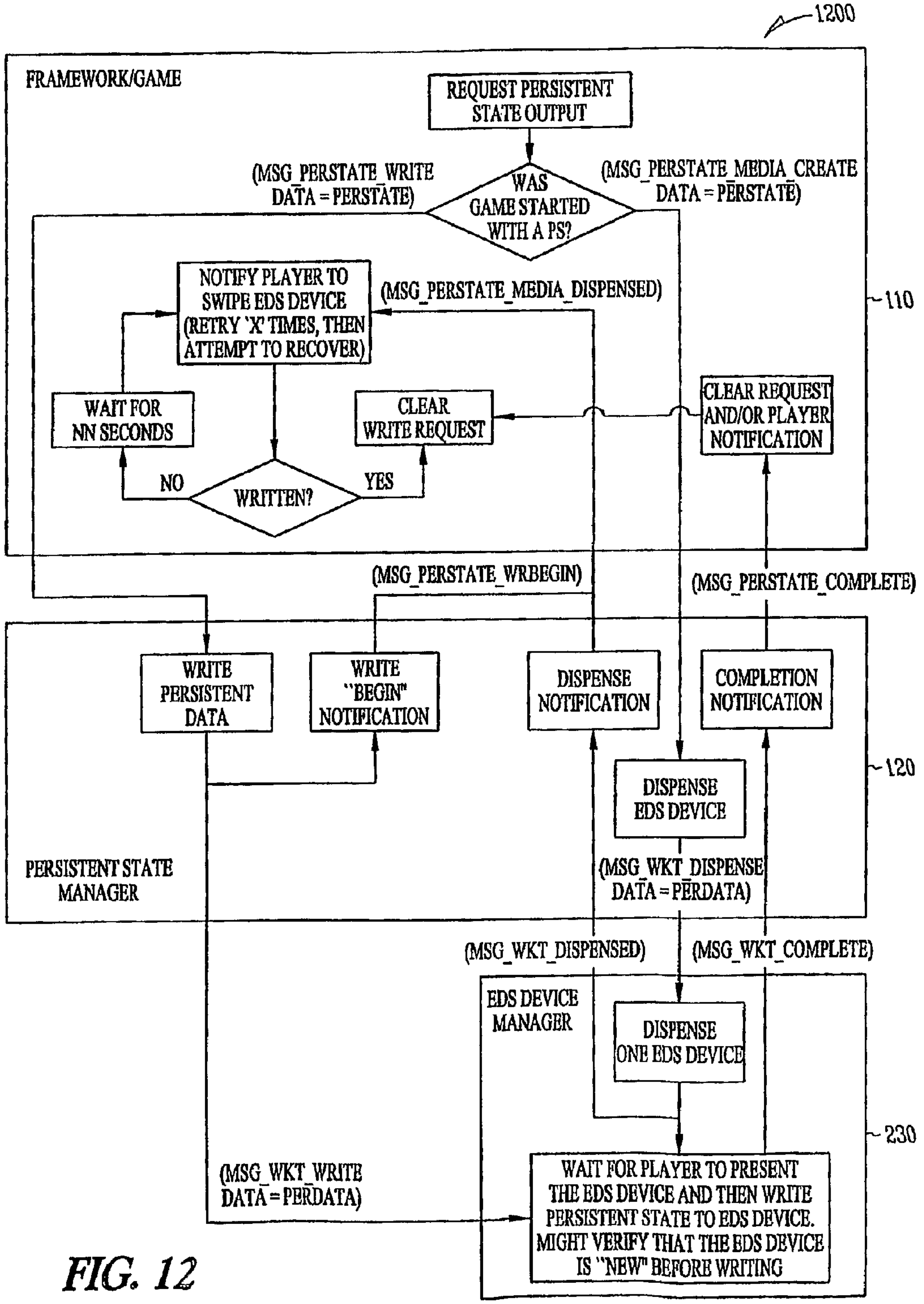
FIGS. 12, 13, 14 and 15 illustrate example uses of messaging between components of a persistent state wagering game to save or load persistent state data according to example embodiments of the inventive subject matter described herein.

Referring now to FIG. 12, there is illustrated an example embodiment 1200 of message use according to the inventive subject matter disclosed herein, wherein the EDS device dispenser 240 does not include a writer and the player takes the dispensed EDS device and presents it to a separate reader/writer 250. In FIG. 12, messages are exchanged between the game software 110, persistent state manager 120 and EDS device manager 230.

Figure 13:
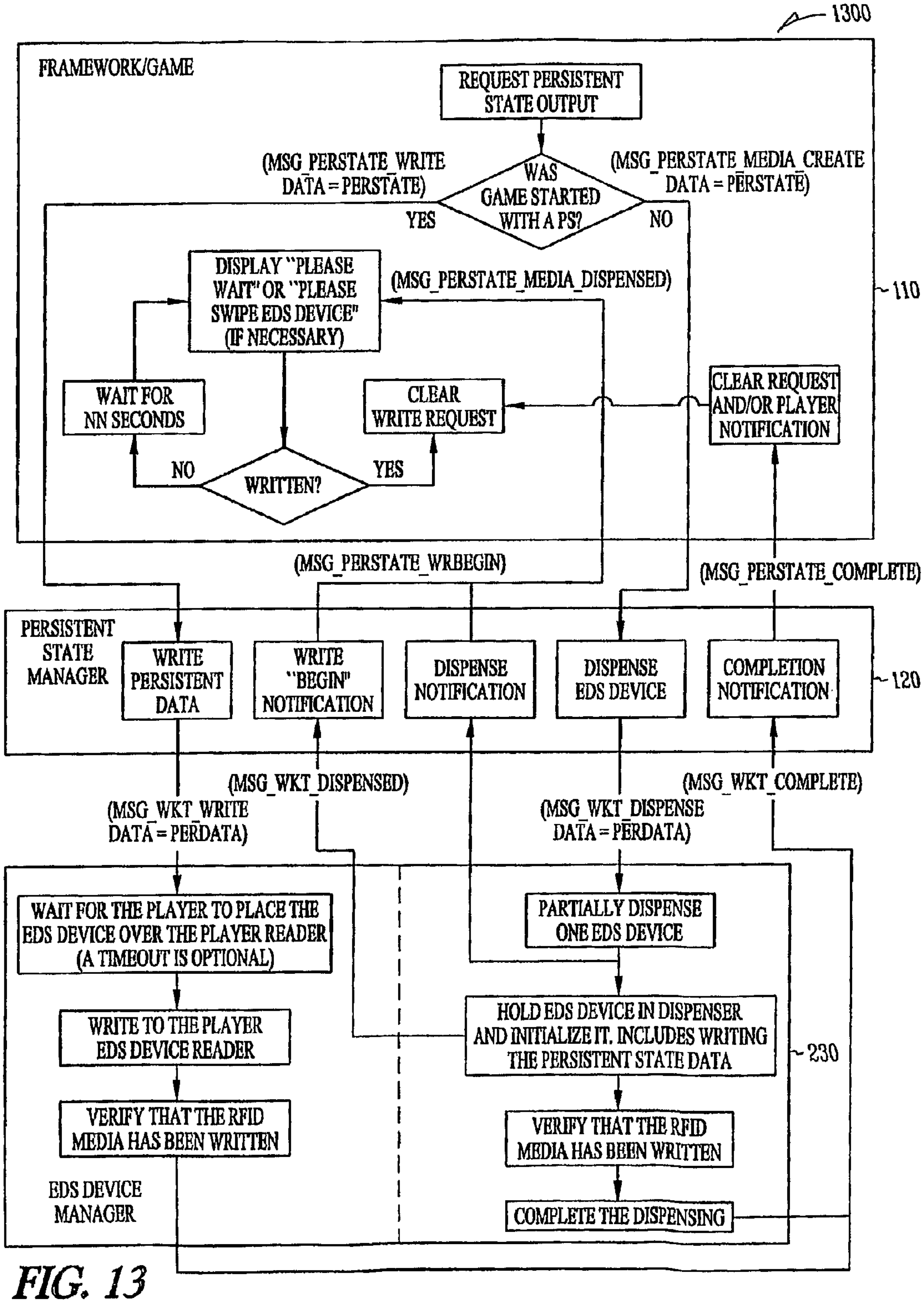

Referring to FIG. 13, there is illustrated an example embodiment 1300 of message use according to the inventive subject matter disclosed herein, wherein the EDS device dispenser 240 includes a writer and the dispenser 240 holds the EDS device to be written and then releases it to the player. In FIG. 13, messages are exchanged between the game software 110, the persistent state manager 120 and the EDS device manager 230.

Figure 14:
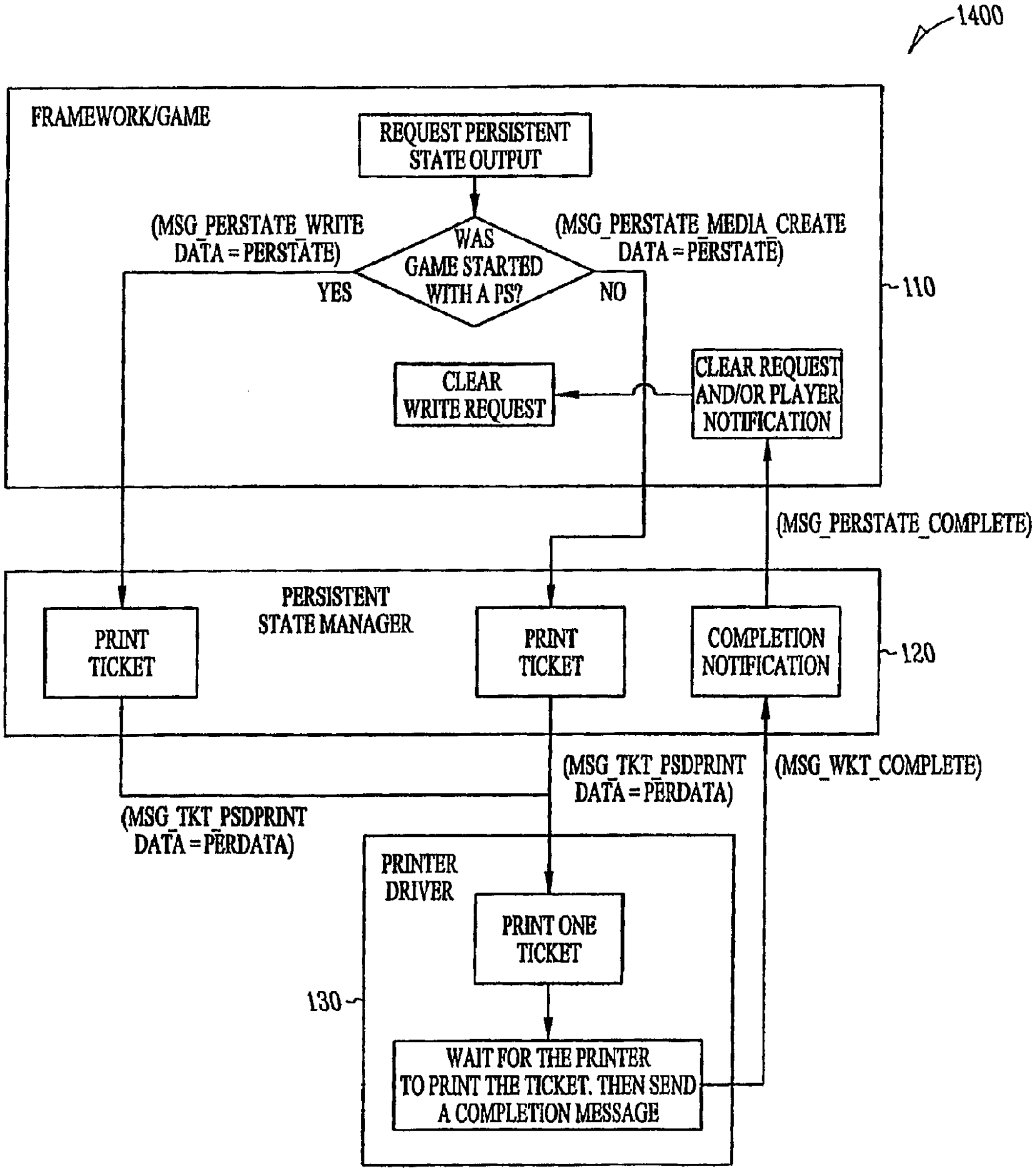

Referring to FIG. 14, there is illustrated an example embodiment 1400 of message use according to the inventive subject matter disclosed herein, wherein persistent state data is output to a printed ticket. In embodiment 1400 messages are exchanged between the game 110, persistent state manager 120 and the printer driver 130.

Figure 15:
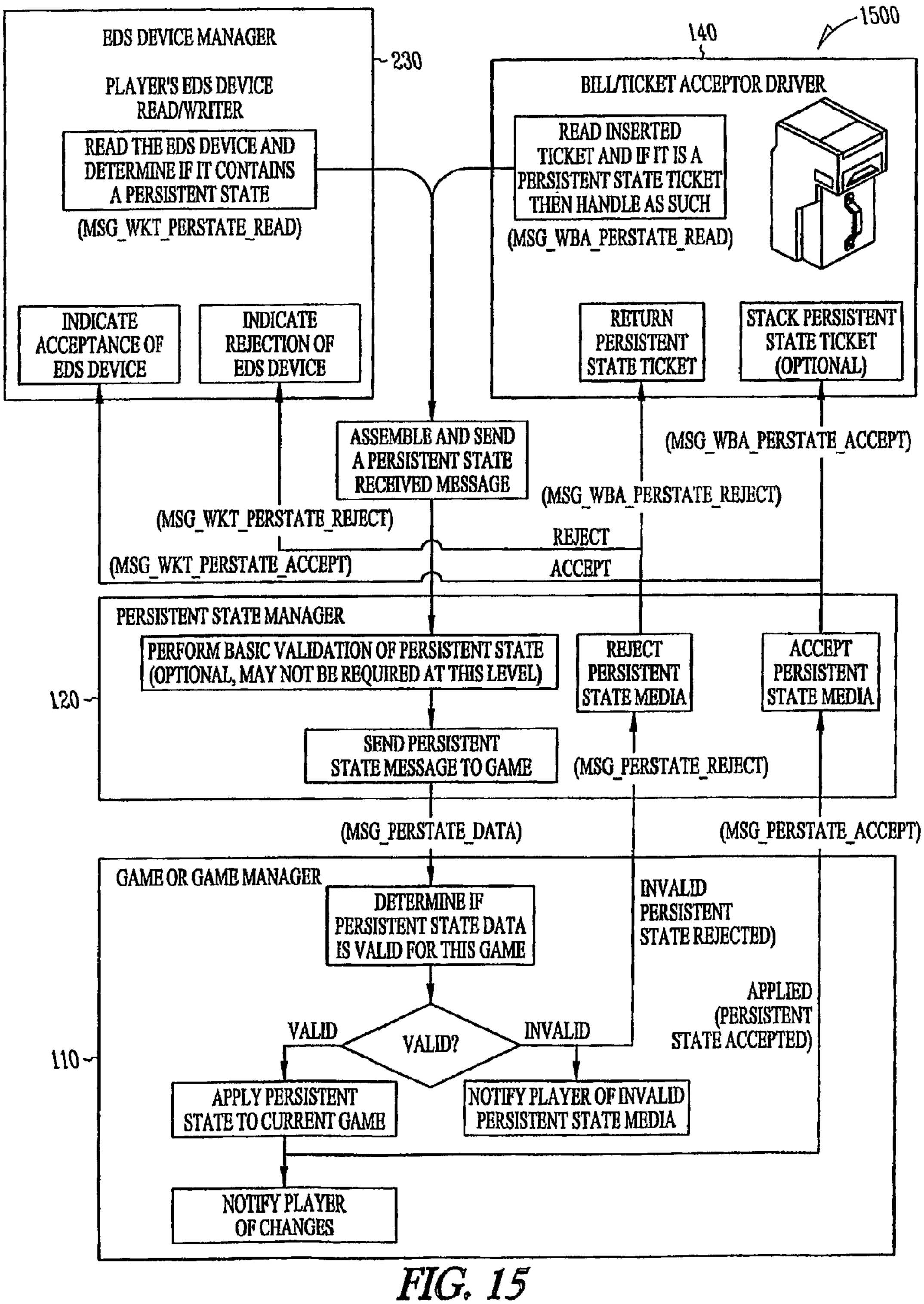

In FIG. 15, there is illustrated an example embodiment 1500 of message use according to the inventive subject matter disclosed herein, wherein persistent state data is applied to game, and the persistent state media may be either a EDS device or a ticket. In this embodiment 1500 messages are exchanged between the game 110, persistent state manager 120 and either the EDS device manager 230 or bill/ticket acceptor driver 140 depending on the source of the persistent state data.

According to another example embodiment, at least some of the persistent state components or the game, as described herein, may be power tolerant. For example, the persistent state manager 120, EDS device manager 230, printer 150, and bill/ticket acceptor 160 may be power tolerant, such that the following items may be retained during power failure: i) current persistent; ii) current operation, for example to determine if a persistent state was in the process of saving when power failed, and if so, the save initiated again once power is restored. The power tolerance, in one embodiment, may be dependent upon the duration of the power failure.

Figure 16:
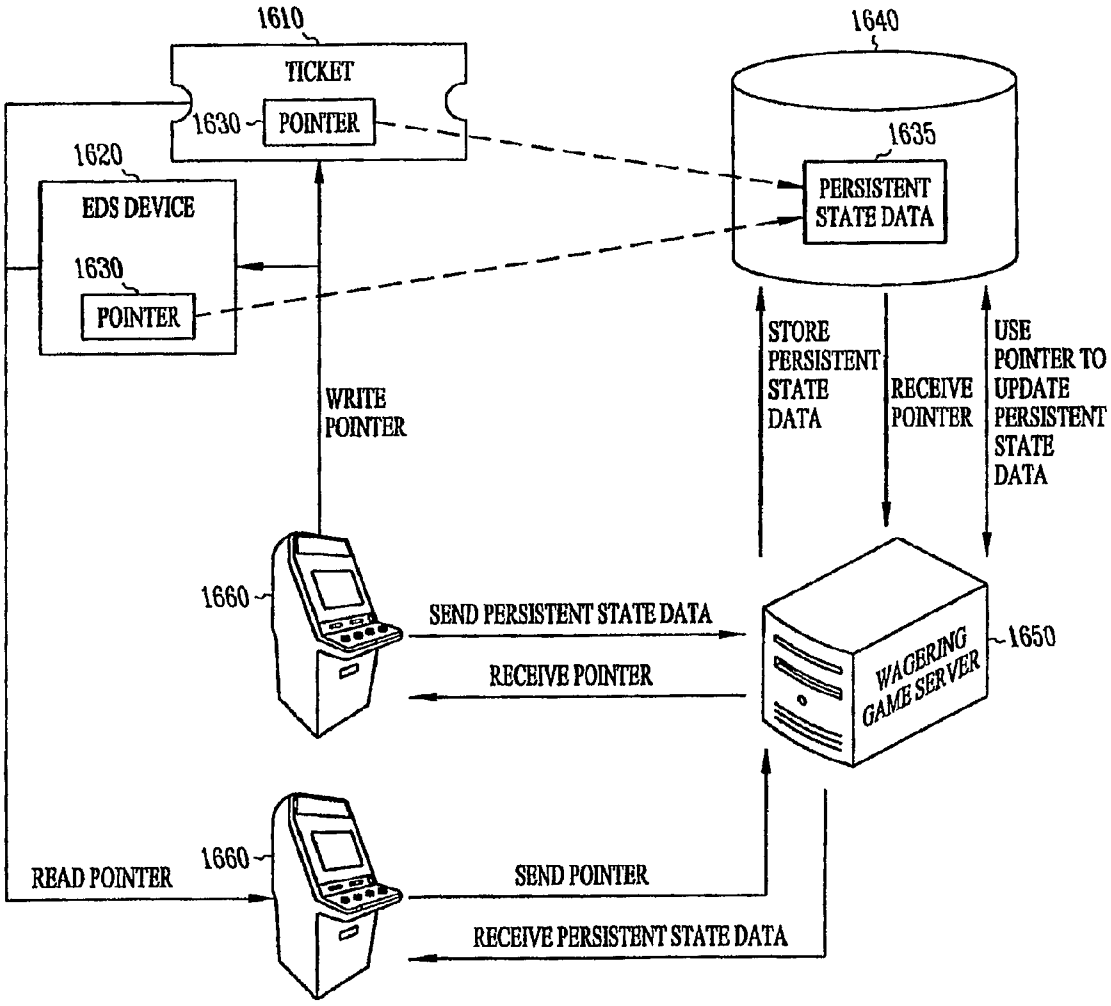
FIG. 16 illustrates another example embodiment according to example embodiments of the inventive subject matter described herein, wherein persistent state data is stored on a server.

According to one example embodiment, persistent state data may be stored entirely on the bar-coded persistent state data ticket or EDS device, such as ticket 170 or on the EDS device 260, such that all persistent state information required to carry persistent state data from one machine or session to another is carried on the ticket or EDS device. In another example embodiment illustrated in FIG. 16, the persistent state data ticket 1610 or EDS device 1620 stores a pointer 1630 used to locate corresponding persistent state data 1635 in a database 1640 stored on a server 1650, and the persistent state data is saved to the database 1640. The pointer 1630 may take the form of any data used to identify a corresponding entry of persistent state data in the database 1640. In this embodiment, when the persistent state ticket or EDS device is read by the wagering game machine, the wagering game machine sends the persistent state data 1635 to the server 1650 and the server 1650 stores the persistent state data in the database 1640, and generates a pointer 1630 for the stored persistent state data. The pointer is returned to the wagering game machine 1660, and printed on the persistent state data ticket 1610 or stored on the EDS device 1620. When the persistent state data ticket 1610 or EDS device 1620 are presented to another wagering game machine or session, the pointer 1630 is used by the wagering game machine 1660 to retrieve the persistent state data 1635 from the database 1640 in server 1650. Wagering game machine 1660 and server 1650 may be connected through a wagering game network such as that described with respect to FIG. 3C.

Thus, as described above there is provided method, system and software for a persistent state game according to various example embodiments. Each of the embodiments described herein are contemplated as falling within the inventive subject matter, which is set forth in the following claims.

The invention claimed is:

1. A gaming system configured to exchange persistent state data between a wagering game and a persistent state hardware device, the wagering game including one or more persistent game states of a plurality of game states, the one or more persistent game states being represented by corresponding persistent state data that, when loaded into the wagering game, establish the wagering game at the corresponding persistent game state, the gaming system comprising:

one or more input devices, one or more display devices;

one or more persistent state hardware devices;

one or more processors; and one or more memory devices storing instructions including a wagering game program and a persistent state manager module, the instructions, when executed by at least one of the one or more processors, causing the gaming system to:

receive, via at least one of the one or more input devices, an input from a player indicative of a wager to initiate the wagering game;

randomly select, via at least one of the one or more processors, an outcome of the wagering game;

display to the player, on at least one of the one or more display devices, the randomly selected outcome;

responsive to a request for persistent state output, send a first store-state message, from the wagering game program to the persistent state manager module, containing first persistent state data related to at least one of the one or more persistent game states, wherein identity and initialization information of the one or more persistent state hardware devices is unavailable to the wagering game program; and responsive to receipt of the first store-state message by the persistent state manager module, send a second store-state message, from the persistent state manager module to at least one of the one or more persistent state hardware devices, the identity and initialization information of the one or more persistent state hardware devices being available to the persistent state manager module, and the second store-state message causing the first persistent state data to be written to data media by the at least one persistent state hardware device.

2. The gaming system of claim 1, wherein the instructions further cause the gaming system to:

send a first restore-state message, from at least one of the one or more persistent state hardware devices to the persistent state manager module, containing second persistent state data; and responsive to receipt of the first restore-state message by the persistent state manage module, send a second restore-state message, from the persistent state manager module to the wagering game program, the second restore-state message causing the wagering game program to establish the wagering game in a persistent game state corresponding to the second persistent state data.

3. The gaming system of claim 2, wherein the persistent game state corresponding to the second persistent state data is the same as the persistent game state corresponding to the first persistent state data.

4. The gaming system of claim 2, wherein establishing the wagering game in the persistent game state corresponding to the second persistent data includes unlocking aspects of the wagering game that were previously locked.

5. The gaming system of claim 1, wherein the one or more persistent state hardware devices include at least one of a ticket printer and an electronic data storage device.

6. The gaming system of claim 1, wherein the one or more persistent state hardware devices include a ticket printer and the persistent state data is written to bar-code printed on a bar-coded ticket.

7. The gaming system of claim 6, wherein the number of digits printed on the bar-coded ticket representing non-credit asset data is different than the number of digits representing credit asset data.

8. A computer-implemented method of conducting a wagering game including one or more persistent game states of a plurality of game states, the one or more persistent game states being represented by corresponding persistent state data that, when loaded into the wagering game, establish the wagering game at the corresponding persistent game state, the method comprising:

receiving, via one or more input devices, an input indicative of a wager to initiate the wagering game;

executing, via at least one of one or more processers, a wagering game program including a randomly selected outcome displayed on one or more display devices;

executing, via at least one of the one or more processors, a persistent state manager module configured to exchange messages between the wagering game program and one or more persistent state hardware devices;

responsive to a request for persistent state output, sending a first store-state message, from the wagering game program to the persistent state manager module, containing first persistent state data related to at least one of the one or more persistent game states, wherein identity and initialization information of the one or more persistent state hardware devices is unavailable to the wagering game program; and responsive to receipt of the first store-state message by the persistent state manager module, sending a second store-state message, from the persistent state manager module to at least one of the one or more persistent state hardware devices, the identity and initialization information of the one or more persistent state hardware devices being available to the persistent state manager module, and the second store-state message causing the first persistent state data to be written to data media by the at least one persistent state hardware device.

9. The computer-implemented method of claim 8, further comprising:

sending a first restore-state message, from at least one of the one or more persistent state hardware devices to the persistent state manager module, containing second persistent state data, and responsive to receipt of the first restore-state message by the persistent state manager module, sending a second restore-state message, from the persistent state manager module to the wagering game program, the second restore-state message causing the wagering game program to establish the wagering game in a persistent game state corresponding to the second persistent state data.

10. The computer-implemented method of claim 9, wherein establishing the wagering game in the persistent game state corresponding to the second persistent state data includes unlocking aspects of the wagering game that were previously locked.

11. The computer-implemented method of claim 9, wherein the persistent game state corresponding to the second persistent state data is the same as the persistent game state corresponding to the first persistent state data.

12. The computer-implemented method of claim 8, wherein the first persistent state data includes credit data and non-credit data, the non-credit data being related to intangible player assets awarded by a winning outcome occurring during game play of the wagering game, and wherein the intangible player assets cannot be converted to monetary value or redeemed for tangible prizes.

13. The computer-implemented method of claim 8, wherein the one or more persistent state hardware devices include at least one of a ticket printer and an electronic data storage device.

14. A machine-readable, non-transitory medium including executable instructions thereon, the instructions including a persistent state manager module and, when executed by at least one of one or more processors, cause a gaming system to perform a method comprising:

receiving, via one or more input devices, an input indicative of a wager to initiate the wagering game;

executing, via at least one of the one or more processors, a wagering game program including a randomly selected outcome displayed on one or more display devices;

executing, via at least one of the one or more processors, the persistent state manager module configured to exchange messages between the wagering game program and one or more persistent state hardware devices;

responsive to receipt of the first store-state message by the persistent state manager module, sending a first store-state message, from the wagering game program to the persistent state manager module, containing first persistent state data related to at least one of the one or more persistent game states, wherein identity and initialization information of the one or more persistent state hardware devices is unavailable to the wagering game program; and responsive to receipt of the first store-state message by the persistent state manager module, sending a second store-state message, from the persistent state manager module to at least one of the one or more persistent state hardware devices, the identity and initialization information of the one or more persistent state hardware devices being available to the persistent state manager module, and the second store-state message causing the first persistent state data to be written to data media by the at least one persistent state hardware device.

15. The machine-readable medium of claim 14, wherein the instructions further cause the gaming system to:

send a first restore-state message, from at least one of the one or more persistent state hardware devices to the persistent state manager module, containing second persistent state data; and responsive to receipt of the first restore-state message by the persistent state manager module, send a second restore-state message, from the persistent state manager module to the wagering game program, the second restore-state message causing the wagering game program to establish the wagering game in a persistent game state corresponding to the second persistent state data.

16. The machine-readable medium of claim 15, wherein establishing the wagering game in the persistent game state corresponding to the second persistent data includes unlocking aspects of the wagering game that were previously locked.

17. The machine-readable medium of claim 14, wherein the machine-readable medium resides in a memory device on a server, the memory device connected for communication with the wagering game program via a communications network.

18. The machine-readable medium of claim 14, wherein the at least one of the one or more persistent state hardware devices is a memory device on a server, the memory device connected for communication with the wagering game program via a communications network, and wherein the second store-state message causes the first persistent state data to be written to data media of the memory device.

19. The machine-readable medium of claim 18, wherein the instructions further cause the gaming system to generate pointer data identifying a location of the first persistent state data on the data media of the memory device, and to provide the pointer data to the persistent state manager module.

20. The machine-readable medium of claim 19, wherein the instructions further cause the gaming system to:

send a first restore-state message, from at least one of the one or more persistent state hardware devices to the persistent state manager module, containing pointer data;

responsive to receipt of the first restore-state message by the persistent state manager module, locate, via the persistent state manager module, first persistent state data residing at a location corresponding to the pointer data and send a second restore-state message, from the persistent state manager module to the wagering game program, causing the wagering game program to establish the wagering game in a persistent game state corresponding to the first persistent state data.

* * * * *

UNITED STATES PATENT AND TRADEMARK OFFICE

CERTIFICATE OF CORRECTION

PATENT NO. : 8,342,944 B2
APPLICATION NO. : 12/278857
DATED : January 1, 2013
INVENTOR(S) : Gagner et al.

It is certified that error appears in the above-identified patent and that said Letters Patent is hereby corrected as shown below:

On the Title page, in column 2, item 56, under "Other Publications", line 1, after "PCT/US2007/003604", insert --,--, therefor Title page 2, in column 2, item 56, under "Other Publications", line 1, after "PCT/US2007/003604", insert --,--, therefor In the Drawings On sheet 8 of 17, Fig. 7, reference numeral 230, line 2, delete "READ" and insert --READER--, therefor On sheet 8 of 17, Fig. 7, reference numeral 110, line 2, delete "PERSISTENT" and insert --(PERSISTENT--, therefor On sheet 16 of 17, Fig. 15, reference numeral 230, line 3, delete "READ" and insert --READER--, therefor On sheet 16 of 17, Fig. 15, reference numeral 110, line 2, delete "PERSISTENT" and insert --(PERSISTENT--, therefor In the Specification In column 3, line 3, after "poker,", delete "blackjack,", therefor In column 3, line 4, delete "receives" and insert --receives,--, therefor In column 4, line 11, delete "210" and insert --110--, therefor In column 4, line 25, after "data", delete "it", therefor Signed and Sealed this
Seventeenth Day of December, 2013

Margaret A. Focarino

Margaret A. Focarino
*Commissioner for Patents of the United States Patent and Trademark Office*

In column 4, line 39, delete “210” and insert --110--, therefor

In column 4, line 46, delete “210” and insert --110--, therefor

In column 5, line 14, after “combination”, insert --of--, therefor

In column 5, line 25, after “poker,”, delete “blackjack,”, therefor

In column 6, line 50, delete “server” and insert --serve--, therefor

In column 7, line 38, after “device”, delete “devices”, therefor

In column 9, line 1, delete “3)” and insert --c)--, therefor

In column 9, line 2, delete “4)” and insert --d)--, therefor

In column 9, line 51, delete “assembles 230” and insert --230 assembles--, therefor In column 10, line 66, delete “is” and insert --are--, therefor In column 11, line 26, after “unable”, insert --to--, therefor In the Claims In column 13, line 24, in claim 2, delete “manage” and insert --manager--, therefor In column 14, line 21, in claim 9, delete “data, and” and insert --data; and--, therefor